United States Patent
Ge et al.

(10) Patent No.: US 12,208,811 B2
(45) Date of Patent: Jan. 28, 2025

(54) SYSTEMS AND METHODS FOR DETERMINING AN ESTIMATED WEIGHT OF A VEHICLE

(71) Applicant: Geotab Inc., Oakville (CA)

(72) Inventors: Yifeng Ge, North York (CA); Mohammad Salman Sabahi, North York (CA); Vinay Kiran Manjunath, Kitchener (CA); Willem Petersen, Elmira (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/597,400

(22) Filed: Mar. 6, 2024

(65) Prior Publication Data
US 2024/0246546 A1  Jul. 25, 2024

Related U.S. Application Data

(63) Continuation of application No. 18/111,951, filed on Feb. 21, 2023, now Pat. No. 12,036,998.
(Continued)

(51) Int. Cl.
*B60W 40/00* (2006.01)
*B60W 40/13* (2012.01)
*G07C 5/00* (2006.01)

(52) U.S. Cl.
CPC ............ *B60W 40/13* (2013.01); *G07C 5/008* (2013.01); *B60W 2556/10* (2020.02); *B60W 2556/45* (2020.02)

(58) Field of Classification Search
CPC ............ B60W 40/13; B60W 2556/10; B60W 2556/45; G07C 5/008
(Continued)

(56) References Cited

U.S. PATENT DOCUMENTS 6,339,749 B1  1/2002  Rieker et al.
6,446,024 B1  9/2002  Leimbach et al.
(Continued)

FOREIGN PATENT DOCUMENTS

CN    110044451 A    7/2019
CN    111311782 A    6/2020
(Continued)

OTHER PUBLICATIONS

Extended European Search Report for European Application No. 23197857.8, mailed Mar. 13, 2024, 8 pages.
(Continued)

*Primary Examiner* — Tiffany P Young
(74) *Attorney, Agent, or Firm* — Gabriel F. Rogers

(57) ABSTRACT

Disclosed herein are methods for determining an estimated weight of a vehicle. The methods comprise operating at least one processor to: receive vehicle data associated with the vehicle, the vehicle data comprising a plurality of vehicle parameters collected during operation of the vehicle; identify one or more vehicle maneuvers based on the vehicle data, each vehicle maneuver being associated with a portion of the vehicle data; and use at least one machine learning model to determine the estimated weight of the vehicle based on the portion of the vehicle data associated with each of the one or more vehicle maneuvers, the at least one machine learning model trained using training data associated with a plurality of previous vehicle maneuvers. Also disclosed are systems for implementing methods of the present disclosure.

21 Claims, 11 Drawing Sheets

Related U.S. Application Data

(60) Provisional application No. 63/445,753, filed on Feb. 15, 2023, provisional application No. 63/430,514, filed on Dec. 6, 2022, provisional application No. 63/413,035, filed on Oct. 4, 2022.

(58) Field of Classification Search
USPC .......................................................... 701/1
See application file for complete search history.

(56) References Cited

U.S. PATENT DOCUMENTS

| | | |
|---|---|---|
| 6,803,530 B2 | 10/2004 | Carlstrom et al. |
| 6,984,192 B2 | 1/2006 | Markyvech |
| 7,039,519 B2 | 5/2006 | Ishiguro et al. |
| 7,363,116 B2 | 4/2008 | Flechtner et al. |
| 7,363,118 B2 | 4/2008 | Jansson |
| 7,395,124 B2 | 7/2008 | Schmidt et al. |
| 7,627,440 B2 | 12/2009 | Rehm et al. |
| 7,873,459 B2 | 1/2011 | Fodor et al. |
| 7,979,185 B2 | 7/2011 | Wolfgang et al. |
| 8,096,174 B2 | 1/2012 | Katou |
| 8,182,050 B2 | 5/2012 | Jackson et al. |
| 8,188,385 B2 | 5/2012 | Wolfgang et al. |
| 8,224,549 B2 | 7/2012 | Grubb |
| 8,271,159 B2 | 9/2012 | Kröber et al. |
| 8,386,144 B2 | 2/2013 | Jackson et al. |
| 8,412,447 B2 | 4/2013 | Hecker et al. |
| 8,483,942 B2 | 7/2013 | Watanabe |
| 8,525,656 B2 | 9/2013 | Saito |
| 8,554,511 B2 | 10/2013 | Fujita et al. |
| 8,700,256 B2 | 4/2014 | Duraiswamy et al. |
| 8,718,914 B2 | 5/2014 | Kim et al. |
| 8,768,536 B2 | 7/2014 | Papajewski et al. |
| 8,793,035 B2 | 7/2014 | Yu et al. |
| 8,798,887 B2 | 8/2014 | Nickolaou et al. |
| 8,892,291 B2 | 11/2014 | Nedorezov et al. |
| 8,918,229 B2 | 12/2014 | Hunt et al. |
| 8,954,246 B2 | 2/2015 | Siegel et al. |
| 8,958,940 B2 | 2/2015 | Kawasaki |
| 8,983,752 B2 | 3/2015 | Harvie |
| 9,020,658 B2 | 4/2015 | Karl et al. |
| 9,045,017 B2 | 6/2015 | Buettner et al. |
| 9,120,488 B2 | 9/2015 | Sukaria |
| 9,129,456 B2 | 9/2015 | Keates et al. |
| 9,157,383 B2 | 10/2015 | Stevens et al. |
| 9,157,785 B2 | 10/2015 | Brenninger |
| 9,170,913 B2 | 10/2015 | Hunt et al. |
| 9,187,090 B2 | 11/2015 | Shiozawa et al. |
| 9,194,765 B2 | 11/2015 | Bråthe et al. |
| 9,280,435 B2 | 3/2016 | Hunt et al. |
| 9,290,185 B2 | 3/2016 | Hall |
| 9,310,242 B2 | 4/2016 | Kammann et al. |
| 9,358,846 B2 | 6/2016 | Singh et al. |
| 9,384,111 B2 | 7/2016 | Hunt et al. |
| 9,396,656 B2 | 7/2016 | Cazanas et al. |
| 9,500,514 B2 | 11/2016 | Roos |
| 9,563,869 B2 | 2/2017 | McQuade et al. |
| 9,658,099 B2 | 5/2017 | Hammerl |
| 9,663,115 B2 | 5/2017 | Singh |
| 9,725,093 B2 | 8/2017 | Chunodkar et al. |
| 9,752,962 B2 | 9/2017 | Singh |
| 9,945,302 B2 | 4/2018 | Keates et al. |
| 9,956,965 B1 | 5/2018 | Hall et al. |
| 9,988,057 B2 | 6/2018 | Flaum et al. |
| 9,989,402 B1 | 6/2018 | Pita-Gil et al. |
| 10,017,035 B2 | 7/2018 | Vik et al. |
| 10,053,104 B2 | 8/2018 | Hall et al. |
| 10,060,782 B2 | 8/2018 | Pita-Gil |
| 10,071,742 B2 | 9/2018 | Hall et al. |
| 10,099,575 B2 | 10/2018 | Yamazaki et al. |
| 10,126,160 B2 | 11/2018 | Brierly |
| 10,132,674 B2 | 11/2018 | Watanabe |
| 10,140,618 B2 | 11/2018 | Crawford et al. |
| 10,152,064 B2 | 12/2018 | Switkes et al. |
| 10,174,833 B2 | 1/2019 | Perantoni et al. |
| 10,189,472 B2 | 1/2019 | Kava et al. |
| 10,198,880 B2 | 2/2019 | Willard et al. |
| 10,214,222 B2 | 2/2019 | Hall et al. |
| 10,216,195 B2 | 2/2019 | Switkes et al. |
| 10,234,871 B2 | 3/2019 | Klaus et al. |
| 10,377,379 B2 | 8/2019 | Lacaze et al. |
| 10,399,597 B2 | 9/2019 | Varunjikar et al. |
| 10,408,668 B2 | 9/2019 | Park et al. |
| 10,480,989 B2 | 11/2019 | Strak et al. |
| 10,507,820 B2 | 12/2019 | Hawley et al. |
| 10,543,846 B2 | 1/2020 | Hall et al. |
| 10,570,839 B2 | 2/2020 | Szwabowski et al. |
| 10,589,700 B2 | 3/2020 | Niedert et al. |
| 10,612,961 B2 | 4/2020 | Huang |
| 10,641,646 B2 | 5/2020 | Holden et al. |
| 10,739,788 B2 | 8/2020 | Switkes et al. |
| 10,740,766 B2 | 8/2020 | Crawford et al. |
| 10,830,294 B2 | 11/2020 | Kim |
| 10,933,824 B2 | 3/2021 | Niedert et al. |
| 11,021,161 B2 | 6/2021 | Åsbogård et al. |
| 11,035,461 B2 | 6/2021 | Kim |
| 11,106,220 B2 | 8/2021 | Switkes et al. |
| 11,110,956 B2 | 9/2021 | George et al. |
| 11,161,515 B1 | 11/2021 | Kang |
| 11,186,286 B2 | 11/2021 | Yi et al. |
| 11,203,271 B2 | 12/2021 | Cha et al. |
| 11,298,991 B2 | 4/2022 | Singh et al. |
| 11,307,081 B2 | 4/2022 | Di Domenico et al. |
| 11,485,371 B2 | 11/2022 | Owen et al. |
| 11,519,776 B2 | 12/2022 | Davis et al. |
| 11,536,579 B2 | 12/2022 | Garbelli |
| 11,573,119 B2 | 2/2023 | Huang et al. |
| 2010/0305822 A1 | 12/2010 | Kresse et al. |
| 2011/0066322 A1 | 3/2011 | Karlsson et al. |
| 2012/0158260 A1 | 6/2012 | Fujii et al. |
| 2013/0073127 A1 | 3/2013 | Kumar et al. |
| 2014/0278041 A1 | 9/2014 | Brenninger |
| 2017/0342920 A1 | 11/2017 | Pirjaberi et al. |
| 2018/0128672 A1 | 5/2018 | Park et al. |
| 2018/0194413 A1 | 7/2018 | Maurer et al. |
| 2019/0318051 A1 | 10/2019 | Oswald et al. |
| 2020/0232842 A1 | 7/2020 | Huang et al. |
| 2020/0317212 A1 | 10/2020 | Rogness et al. |
| 2021/0163018 A1 | 6/2021 | Oh et al. |
| 2021/0178849 A1 | 6/2021 | Park |
| 2021/0201034 A1 | 7/2021 | Izawa et al. |
| 2021/0239515 A1 | 8/2021 | Valdemarsson et al. |
| 2022/0041172 A1 | 2/2022 | Jundt et al. |
| 2022/0144289 A1 | 5/2022 | Rezaeian et al. |
| 2022/0155130 A1 | 5/2022 | Laine et al. |
| 2022/0176832 A1 | 6/2022 | Espig et al. |
| 2022/0219691 A1 | 7/2022 | Maleki |
| 2022/0242391 A1 | 8/2022 | Mathews, Jr. et al. |
| 2022/0363270 A1 | 11/2022 | Abdollahpouri et al. |
| 2022/0381570 A1 | 12/2022 | Cui et al. |
| 2023/0035599 A1 | 2/2023 | Pettersson |

FOREIGN PATENT DOCUMENTS

| | | | |
|---|---|---|---|
| CN | 112819031 A | 5/2021 | |
| EP | 3682417 B1 * | 1/2024 | ............ B60W 40/06 |
| WO | 2009071104 A1 | 6/2009 | |

OTHER PUBLICATIONS

Extended European Search Report for European Application No. 22205714.3, mailed May 4, 2023, 5 Pages.

Extended European Search Report for European Application No. 22206523.7, mailed May 4, 2023, 5 Pages.

Nguyen P.X., et al., "Vehicles Weight Estimation Using Smartphone's Acceleration Data to Control Overloading," Springer Science + Business Media, LLC, Whole Article, Jul. 7, 2017, pp. 151-162.

* cited by examiner

SYSTEMS AND METHODS FOR DETERMINING AN ESTIMATED WEIGHT OF A VEHICLE

CROSS-REFERENCE TO RELATED APPLICATIONS

This application claims priority to and the benefit of U.S. Patent Application Ser. No. 63/413,035, filed on Oct. 4, 2022, U.S. Patent Application Ser. No. 63/430,514, filed on Dec. 6, 2022, and U.S. Patent Application Ser. No. 63/445,753, filed on Feb. 15, 2023, each of which are hereby incorporated by reference in their entirety. This application is also a continuation of U.S. patent application Ser. No. 18/111,951, also incorporated by reference in its entirety.

TECHNICAL FIELD

The present disclosure generally relates to weight estimation. More specifically, the present disclosure relates to determining an estimated weight of a vehicle.

BACKGROUND

The weight of a vehicle may affect a number of aspects of its operation. For example, the weight of a commercial vehicle may affect whether the vehicle is subject to regulatory restrictions. In more detail, there are often regulations defining the maximum weight of commercial vehicles in order to prevent overloading thereof.

Further, vehicles may be prohibited from entering certain geographical areas or travelling along certain routes based on their weight. For example, some motorways cross bridges that have weight limits that may not be suitable for vehicles carrying a heavy load.

As will also be appreciated, the weight of a vehicle may also affect its fuel economy. For example, a heavier vehicle may require more fuel to travel the same distance as a similar, lighter vehicle, which is not only more expensive but may also subject the heavier vehicle to regulations that require a specific minimum fuel economy.

It therefore may be useful to know the weight of a vehicle. However, the standard methods of measuring the weight of a vehicle may be inaccessible, difficult, expensive, and/or inaccurate. For example, one common method of weighing a vehicle involves the use of an external weighing device such as a truck scale or a weighbridge. However, such external weighing devices may not always be accessible and cannot measure the weight of a vehicle during operation—i.e., when the vehicle is in motion. Another method of weighing a vehicle involves the use of load sensors installed in the vehicle. However, as will be appreciated, the installation of such load sensors is generally difficult and expensive.

Thus, there is a need for improved systems and methods for determining the weight of a vehicle that are readily accessible while also being useable without difficult, expensive installations.

SUMMARY

In one aspect, the present disclosure relates to a method for determining an estimated weight of a vehicle. The method comprises operating at least one processor to: receive vehicle data associated with the vehicle, the vehicle data comprising a plurality of vehicle parameters collected during operation of the vehicle; identify one or more vehicle maneuvers based on the vehicle data, each vehicle maneuver being associated with a portion of the vehicle data; and use at least one machine learning model to determine the estimated weight of the vehicle based on the portion of the vehicle data associated with each of the one or more vehicle maneuvers, the at least one machine learning model trained using training data associated with a plurality of previous vehicle maneuvers.

According to an embodiment, each portion of the vehicle data comprises geospatial data, vehicle engine data, or a combination thereof from a duration of the one or more vehicle maneuvers.

According to a further embodiment, each portion of the vehicle data comprises a normalized accumulated RPM, a normalized accumulated torque, energy, a normalized difference in speed, a normalized difference in elevation, a mean acceleration, a normalized number of gear changes, a change in speed over a selected subsection of time, a change in elevation over a selected subsection of time, or a combination thereof. In a further embodiment, the change in speed over a selected subsection of time is a change in speed over a first 3 second interval of the one or more vehicle maneuvers. In a further embodiment, the change in elevation over a selected subsection of time is a change in elevation over a first 3 second interval of the one or more vehicle maneuvers.

According to an embodiment, the training data comprises a normalized accumulated RPM, a normalized accumulated torque, energy, a normalized difference in speed, a normalized difference in elevation, a mean acceleration, a normalized number of gear changes, a change in speed over a selected subsection of time, a change in elevation over a selected subsection of time, or a combination thereof, from a duration of the plurality previous vehicle maneuvers. In a further embodiment, the change in speed over a selected subsection of time is a change in speed over a first 3 second interval of each of the plurality of previous vehicle maneuvers. In a further embodiment, the change in elevation over a selected subsection of time is a change in elevation over a first 3 second interval of each of the plurality of previous vehicle maneuvers.

According to an embodiment, the at least one machine learning model comprises a supervised learning model, a semi-supervised learning model, an unsupervised learning model, or a combination thereof. In a further embodiment, the at least one machine learning model comprises a Random Forest model, an AutoEncoder, an AutoInt model, a Tabnet model, or a combination thereof.

According to an embodiment, each vehicle maneuver and each previous vehicle maneuver comprises an acceleration maneuver.

According to an embodiment, the determining of the estimated weight of the vehicle using the at least one machine learning model comprises determining a load state of the vehicle. In a further embodiment, a plurality of load states are determined based on the portions of vehicle data associated with a plurality of vehicle maneuvers. In a yet further embodiment, the method further comprises operating the at least one processor to determine an overall load state of the vehicle based on the plurality of load states. In a yet further embodiment, the determining of the overall load state of the vehicle comprises averaging or aggregating the plurality of load states. In a still further embodiment, each of the portions of vehicle data comprises a measured vehicle parameter profile; and the method further comprises operating the at least one processor to: receive a plurality of simulated vehicle parameter profiles for one or more of the previous vehicle maneuvers, generate a plurality of error profiles for each of the one or more vehicle maneuvers based on differences between the plurality of simulated vehicle parameter profiles and the measured vehicle parameter profile, and determine an estimated weight value of the vehicle by minimizing, averaging, or a combination thereof the plurality of error profiles. In a yet further embodiment, the measured vehicle condition profile comprises a measured torque profile and the plurality of simulated vehicle condition profiles comprise simulated torque profiles.

According to an embodiment, the determining of the estimated weight of the vehicle using the at least one machine learning model comprises determining an estimated weight value of the vehicle. In a further embodiment, a plurality of estimated weight values are determined based on the portions of vehicle data associated with a plurality of vehicle maneuvers. In a yet further embodiment, the method further comprises operating the at least one processor to determine an overall estimated weight value of the vehicle based on the plurality of estimated weight values. In a yet further embodiment, the determining of the overall estimated weight value of the vehicle comprises averaging or aggregating the plurality of estimated weight values.

According to an embodiment, the received vehicle data is curve-logged, interpolated vehicle data.

In a further aspect, the present disclosure relates to a system for determining an estimated weight of a vehicle. The system comprises at least one data storage configured to store vehicle data associated with the vehicle, the vehicle data comprising a plurality of vehicle parameters collected during operation of the vehicle. The system also comprises at least one processor in communication with the at least one data storage. The at least one processor is configured to identify one or more vehicle maneuvers based on the vehicle data, each vehicle maneuver being associated with a portion of the vehicle data; and use at least one machine learning model to determine the estimated weight of the vehicle based on the portion of the vehicle data associated with each of the one or more vehicle maneuvers, the at least one machine learning model trained using training data associated with a plurality of previous vehicle maneuvers.

According to an embodiment, each portion of the vehicle data comprises geospatial data, vehicle engine data, or a combination thereof from a duration of the one or more vehicle maneuvers.

According to an embodiment, each portion of the vehicle data comprises a normalized accumulated RPM, a normalized accumulated torque, energy, a normalized difference in speed, a normalized difference in elevation, a mean acceleration, a normalized number of gear changes, a change in speed over a selected subsection of time, a change in elevation over a selected subsection of time, or a combination thereof. In a further embodiment, the change in speed over a selected subsection of time is a change in speed over a first 3 second interval of the one or more vehicle maneuvers. In a further embodiment, the change in elevation over a selected subsection of time is a change in elevation over a first 3 second interval of the one or more vehicle maneuvers.

According to an embodiment, the training data comprises a normalized accumulated RPM, a normalized accumulated torque, energy, a normalized difference in speed, a normalized difference in elevation, a mean acceleration, a normalized number of gear changes, a change in speed over a selected subsection of time, a change in elevation over a selected subsection of time, or a combination thereof, from a duration of the plurality previous vehicle maneuvers. In a further embodiment, the change in speed over a selected subsection of time is a change in speed over a first 3 second interval of each of the plurality of previous vehicle maneuvers. In a further embodiment, the change in elevation over a selected subsection of time is a change in elevation over a first 3 second interval of each of the plurality of previous vehicle maneuvers.

According to an embodiment, the at least one machine learning model comprises a supervised learning model, a semi-supervised learning model, an unsupervised learning model, or a combination thereof. In a further embodiment, the at least one machine learning model comprises a Random Forest model, an AutoEncoder, an AutoInt model, a Tabnet model, or a combination thereof.

According to an embodiment, each vehicle maneuver and each previous vehicle maneuver comprises an acceleration maneuver.

According to an embodiment, the determining of the estimated weight of the vehicle using the at least one machine learning model comprises determining a load state of the vehicle. In a further embodiment, a plurality of load states are determined based on the portions of vehicle data associated with a plurality of vehicle maneuvers. In a yet further embodiment, the at least one processor is configured to determine an overall load state of the vehicle based on the plurality of load states. In a yet further embodiment, the overall load state of the vehicle is determined averaging or aggregating the plurality of load states. In a still further embodiment, each of the portions of vehicle data comprises a measured vehicle parameter profile; and the at least one processor is configured to: receive a plurality of simulated vehicle parameter profiles for one or more of the previous vehicle maneuvers, generate a plurality of error profiles for each of the one or more vehicle maneuvers based on differences between the plurality of simulated vehicle parameter profiles and the measured vehicle parameter profile, and determine an estimated weight value of the vehicle by minimizing, averaging, or a combination thereof the plurality of error profiles. In a yet further embodiment, the measured vehicle condition profile comprises a measured torque profile and the plurality of simulated vehicle condition profiles comprise simulated torque profiles.

According to an embodiment, the determining of the estimated weight of the vehicle using the at least one machine learning model comprises determining an estimated weight value of the vehicle. In a further embodiment, a plurality of estimated weight values are determined based on the portions of vehicle data associated with a plurality of vehicle maneuvers. In a yet further embodiment, the at least one processor is configured to determine an overall estimated weight value of the vehicle based on the plurality of estimated weight values. In a yet further embodiment, the overall estimated weight value of the vehicle is determined by averaging or aggregating the plurality of estimated weight values.

According to an embodiment, the received vehicle data is curve-logged, interpolated vehicle data.

In a yet further aspect, the present disclosure relates to a method of training at least one machine learning model, the method comprising operating at least one processor to: receive vehicle data associated with one or more vehicles, the vehicle data comprising a plurality of portions of vehicle data that are each associated with a vehicle maneuver and that each comprise a measured vehicle parameter profile; receive a plurality of simulated vehicle parameter profiles for at least one measured vehicle parameter profile; generate a plurality of error profiles based on differences between each of the at least one measured vehicle parameter profiles and the plurality of simulated vehicle parameter profiles; determine, using the plurality of error profiles, an estimated vehicle weight associated with each of the at least one measured vehicle parameter profiles; input the plurality of portions of vehicle data into the at least one machine learning model to thereby train the at least one machine learning model to estimate a weight of a vehicle using the vehicle data associated therewith.

According to an embodiment, each portion of the vehicle data comprises geospatial data, vehicle engine data, or a combination thereof from a duration of the vehicle maneuver. In a further embodiment, each portion of the vehicle data comprises a normalized accumulated RPM, a normalized accumulated torque, energy, a normalized difference in speed, a normalized difference in elevation, a mean acceleration, a normalized number of gear changes, a change in speed over a selected subsection of time, a change in elevation over a selected subsection of time, or a combination thereof. In a yet further embodiment, the change in speed over a selected subsection of time is a change in speed over a first 3 second interval of the one or more vehicle maneuvers. In a yet further embodiment, the change in elevation over a selected subsection of time is a change in elevation over a first 3 second interval of the one or more vehicle maneuvers.

According to an embodiment, the at least one machine learning model comprises a supervised machine learning model, a semi-supervised machine learning model, or a combination thereof. In a further embodiment, the at least one machine learning model comprises a Random Forest model, an AutoEncoder model, an AutoInt model, a Tabnet model, or a combination thereof.

According to an embodiment, the estimated vehicle weight associated with each of the at least one measured vehicle parameter profiles is an estimated vehicle load state and/or an estimated vehicle weight value.

According to an embodiment, each measured vehicle parameter profile comprises a measured torque profile and each of the simulated vehicle parameter profiles comprises a simulated torque profile.

According to an embodiment, the plurality of simulated vehicle parameter profiles are received for each measured vehicle parameter profile.

According to an embodiment, the determining of the estimated vehicle weight associated with each of the at least one measured vehicle parameter profiles comprises minimizing, averaging, or a combination thereof the plurality of error profiles.

According to an embodiment, the determining of the estimated vehicle weight associated with each of the at least one measured vehicle parameter profiles comprises determining an error associated with the estimated vehicle weight. In a further embodiment, each of the portions of vehicle data input into the at least one machine learning model comprise a measured vehicle parameter profile associated with an estimated weight having an error of less than 25%.

In a yet further aspect, the present disclosure related to a method of training at least one machine learning model, the method comprising operating at least one processor to: receive vehicle data associated with one or more vehicles, the vehicle data comprising a plurality of portions of vehicle data that are each associated with a vehicle maneuver and that each comprise a measured vehicle parameter profile comprising a normalized accumulated RPM, a normalized accumulated torque, energy, a normalized difference in speed, a normalized difference in elevation, a mean acceleration, a normalized number of gear changes, a change in speed over a selected subsection of time, and a change in elevation over a selected subsection of time, or a combination thereof; and input the plurality of portions of vehicle data into the at least one machine learning model to thereby train the at least one machine learning model to estimate a weight of a vehicle using the vehicle data associated therewith.

According to an embodiment, the change in speed over a selected subsection of time is a change in speed over a first 3 second interval of the one or more vehicle maneuvers.

According to an embodiment, the change in elevation over a selected subsection of time is a change in elevation over a first 3 second interval of the one or more vehicle maneuvers.

According to an embodiment, the at least one machine learning model comprises an unsupervised machine learning model.

In a yet further aspect, the present disclosure relates to a non-transitory computer readable medium having instructions stored thereon executable by at least one processor to implement a method for determining an estimated weight of a vehicle. The implementable method comprises operating the at least one processor to: receive vehicle data associated with the vehicle, the vehicle data comprising a plurality of vehicle parameters collected during operation of the vehicle; identify one or more vehicle maneuvers based on the vehicle data, each vehicle maneuver being associated with a portion of the vehicle data; and use at least one machine learning model to determine the estimated weight of the vehicle based on the portion of the vehicle data associated with each of the one or more vehicle maneuvers, the at least one machine learning model trained using training data associated with a plurality of previous vehicle maneuvers.

Other aspects and features of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
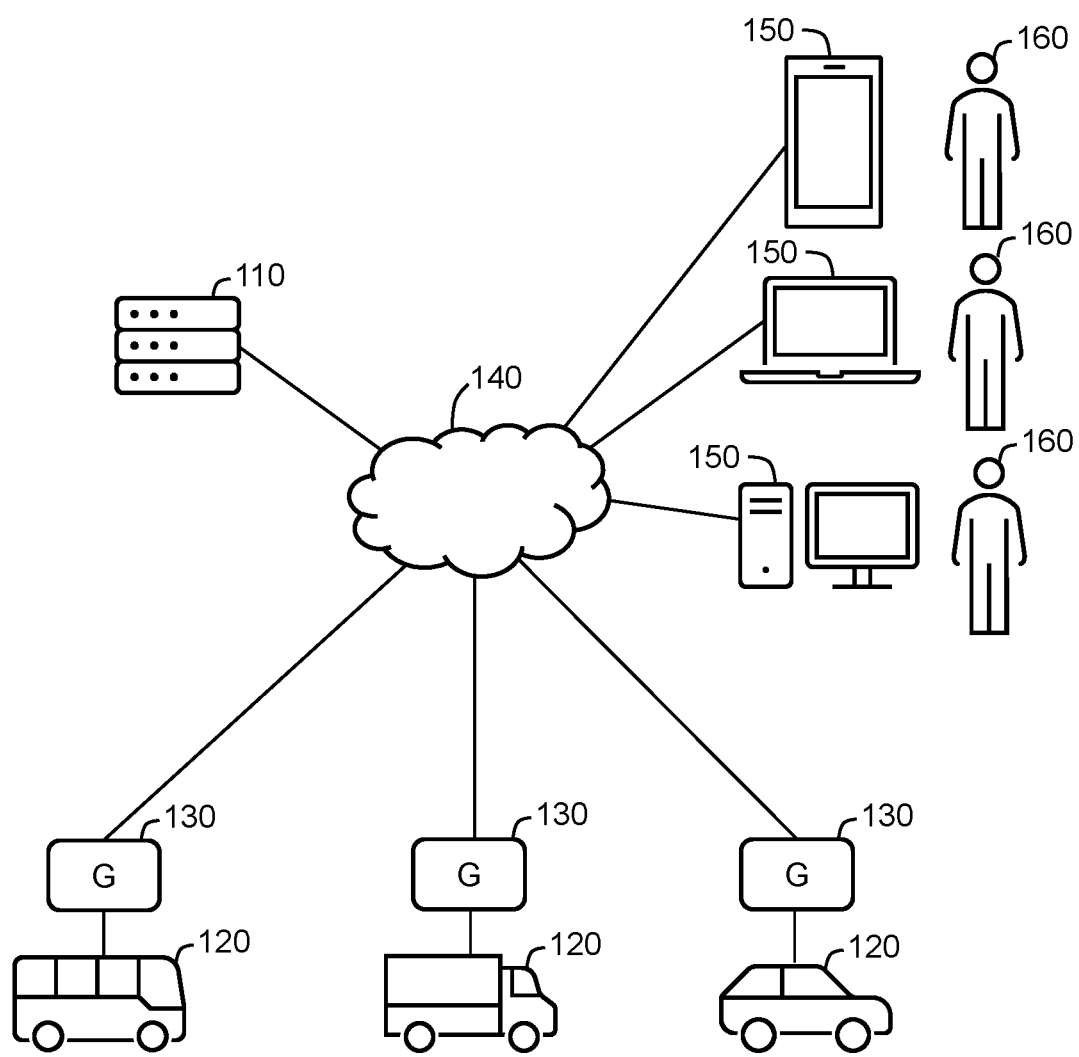
FIG. 1 is a block diagram of various components interacting with an example fleet management system and a plurality of telematic devices according to an embodiment of the present disclosure.

As discussed herein, conventional methods for weighing vehicles involve the use of external weighing devices such as truck scales or weighbridges, or the use of vehicle-installed weighing devices such as load sensors. However, the conventional methods for weighing vehicles have a number of drawbacks, including inaccessibility of external weighing devices as well as the difficulty of, and the costs associated with, the installation of the vehicle-installed weighing devices.

Thus, it is an objective of the present disclosure to provide advantageous systems and methods for determining an estimated weight of a vehicle. For example, the systems and methods may advantageously be able to estimate the weight of a vehicle during operation. In more detail, the systems and methods of the present disclosure may be able to estimate the weight of a vehicle in motion and in real-time, without requiring the vehicle to stop onto, for example, a truck scale or weighbridge.

Further, the systems and methods of the present disclosure may advantageously estimate the weight of a vehicle using various data associated therewith (i.e., vehicle data) that is produced during the normal operation of the vehicle. In more detail, vehicles may produce vehicle data including information, parameters, attributes, characteristics, and/or features associated with the operation thereof during regular use. The vehicle data may include location data, speed data, acceleration data, engine data, fluid level data (e.g., oil, coolant, and/or washer fluid level data), energy data (e.g., battery or fuel level data), etc. As will be described herein, such vehicle data is generally readily accessible. In contrast, conventional methods may require the use of vehicle data not produced during normal operation of the vehicle, which data is generally not accessible and may require the installation of specialized devices to collect. For example, conventional methods may involve the installation of load sensors to estimate vehicle weight, which may be difficult and expensive to install.

Furthermore, in some embodiments, the vehicle data used by the systems and methods of the present disclosure may advantageously be collected through a readily available and/or installable device such as a telematics device. As will be appreciated, telematics devices may collect the vehicle data for processing either by the telematics devices themselves or by one or more external devices and/or systems. The telematics device may be a pre-installed device (e.g., by the Original Equipment Manufacturer or "OEM") or a standalone telematics device (e.g., an aftermarket device), which may be readily installable via an ODB-II (on-board diagnostics) port and/or CAN bus (controller area network) port. In contrast, as described herein, conventional methods for determining a vehicle weight may involve the installation of a load sensor, which is not installable via readily accessible ports such as ODB-II ports and/or CAN bus ports, and generally has to be securely mounted between the frame under a vehicle and an axle thereof.

Additional advantages will be discussed below and will be readily apparent to those of ordinary skill in the art reading the present disclosure.

Reference will now be made in detail to example embodiments of the present disclosure, wherein numerals refer to like components, examples of which are illustrated in the accompanying drawings that further show example embodiments, without limitation.

Referring now to FIG. 1, there is shown an example of a fleet management system 110 for managing a plurality of vehicles 120 equipped with a plurality of telematics devices 130. Each of the telematics devices 130 is capable of collecting various vehicle data from the vehicles 120 and sharing the vehicle data with the fleet management system 110. The fleet management system 110 may be remotely located from the telematics devices 130 and the vehicles 120.

As will be appreciated, the vehicles 120 may include any type of vehicle. For example, the vehicles 120 may include motor vehicles such as cars, trucks (e.g., pickup trucks, heavy-duty trucks such as class-8 vehicles, etc.), motorcycles, industrial vehicles (e.g., buses), and the like. Each motor vehicle may be a gas, diesel, electric, hybrid, and/or alternative fuel vehicle. Further, the vehicles 120 may include vehicles such as railed vehicles (e.g., trains, trams, and streetcars), watercraft (e.g., ships and recreational pleasure craft), aircraft (e.g., airplanes and helicopters), spacecraft, and the like. Each of the vehicles 120 may be equipped with one of the telematics devices 130.

In some embodiments, the telematics devices 130 may be standalone devices that are removably installed in the vehicles 120 (e.g., aftermarket telematics devices). In other embodiments, the telematics devices 130 may be integrated components of the vehicles 120 (e.g., pre-installed by an OEM). The telematics devices 130 may collect various vehicle data and share the vehicle data with the fleet management system 110. As discussed herein, the vehicle data may include any information, parameters, attributes, characteristics, and/or features associated with the vehicles 120. For example, the vehicle data may include geospatial data, engine data, or a combination thereof. In more detail, the vehicle data may include, but is not limited to, location data, speed data, acceleration data, fluid level data (e.g., oil, coolant, and washer fluid), energy data (e.g., battery and/or fluid level), or a combination thereof.

Once received, the fleet management system 110 may process the vehicle data collected from the telematics devices 130 to provide various analysis and reporting. In some embodiments, the fleet management system 110 may process the vehicle data to provide additional information about the vehicles 120 such as trip distances and times, idling times, harsh braking and driving, usage rates, fuel economy, etc. As will be discussed in greater detail below, various data analytics and machine learning models may be implemented to process the vehicle data. The vehicle data may then be used to manage various aspects of the vehicles 120, such as route planning, vehicle maintenance, driver compliance, asset utilization, fuel management, and the like, which, in turn, may improve productivity, efficiency, safety, and/or sustainability of the vehicles 120.

A plurality of computing devices 150 may provide access to the fleet management system 110 to a plurality of users 160. The users 160 may use computing devices 150 to access or retrieve various vehicle data collected and/or process by the fleet management system 110. As will be appreciated, the computing devices 150 may be any suitable computing devices. For example, the computing devices 150 may be personal computers, portable computers, wearable computers, workstations, desktops, laptops, smartphones, tablets, smartwatches, personal digital assistants (PDAs), mobile devices, or the like. The computing devices 150 may be remotely located from the fleet management system 110, telematic devices 130, and vehicles 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Figure 2:
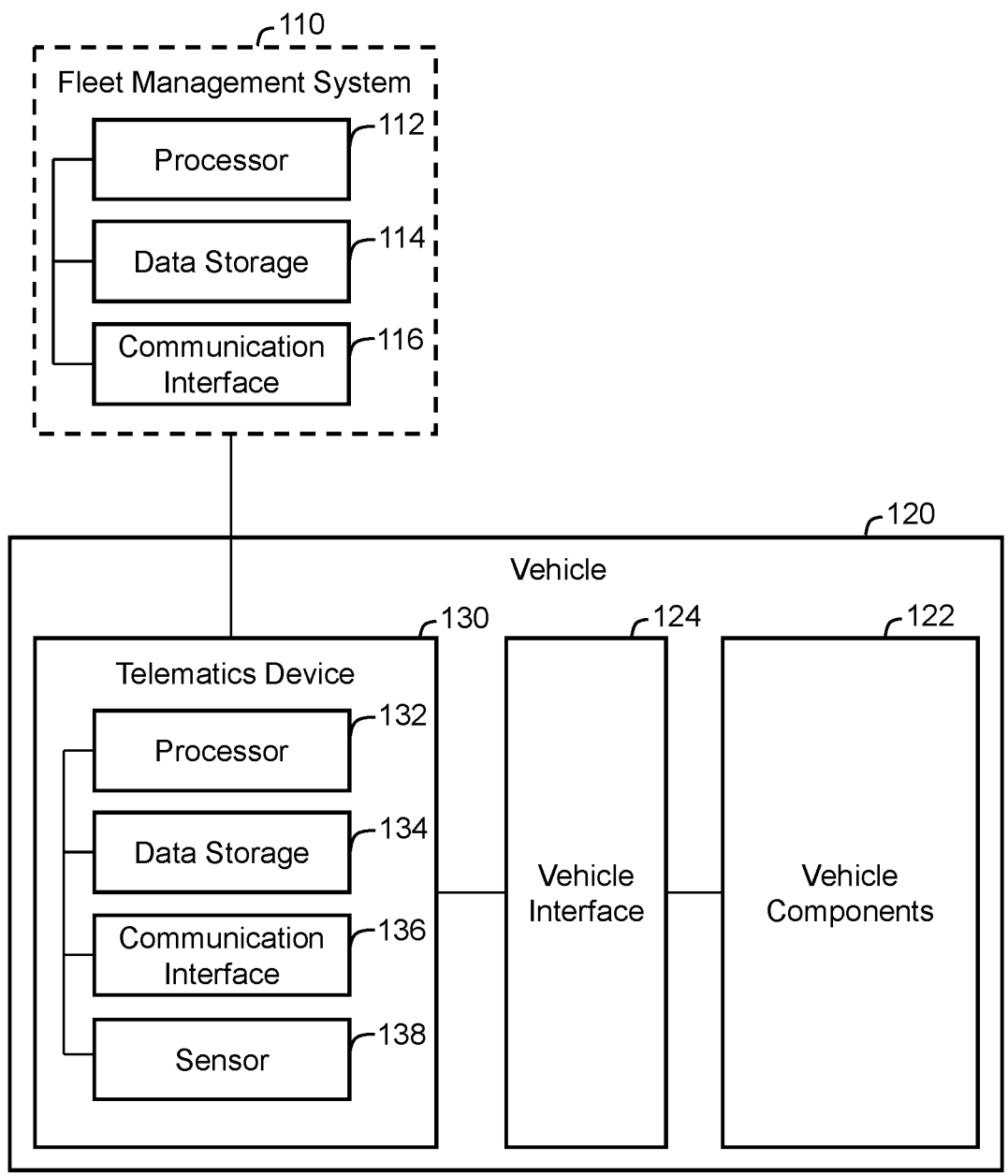
FIG. 2 is a block diagram of the fleet management system shown in FIG. 1 interacting with one of the telematics devices and vehicles shown in FIG. 1 according to an embodiment of the present disclosure.

Referring now to FIG. 2, there is illustrated the fleet management system 110 in communication with one of the telematics devices 130 that is installed in one of the vehicles 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area. In some embodiments, the fleet management system 110 may be implemented using a cloud computing system.

The processor 112 may control the operation of the fleet management system 110. As will be appreciated, the processor 112 may be implemented using one or more suitable processing devices. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various vehicle data collected by the fleet management system 110 from the telematics devices 130.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various vehicle data collected from the telematics devices 130 and/or processed by the processor 112.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to retrieve vehicle data from the telematics devices 130.

The telematics devices 130 may include a processor 134, a data storage 134, and a communication interface 136. The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various vehicle data collected from vehicle components 122 and/or the sensor 138.

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various vehicle data collected from the vehicle components 122 and/or the sensor 138.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect vehicle data from the vehicle components 122 and/or sensor 138, to send vehicle data to the fleet management system 110, etc.

The sensor 138 may detect and/or measure various environmental events, changes, etc. The sensor 138 may comprise any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect vehicle data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

The telematics device 130 may be installed within the vehicle 120 removably or integrally. The vehicle 120 may include the vehicle components 122 and a vehicle interface 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may collect vehicle data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may comprise an ODB-II port and/or CAN bus port. The vehicle interface 124 may be used by the telematics device 130 to collect vehicle data from the vehicle components 122. For example, the communication interface 136 may be connected to the vehicle interface 124 to communicate with the vehicle components 122.

Figure 3:
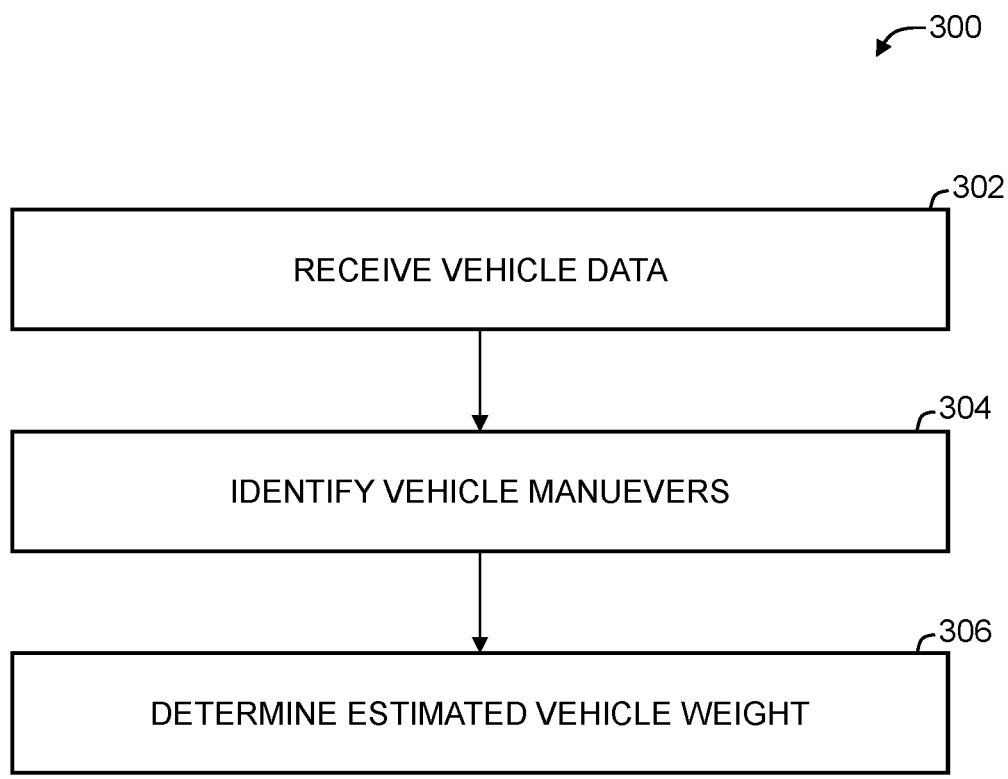
FIG. 3 is a flowchart of an example method for determining an estimated weight of a vehicle according to an embodiment of the present disclosure.

Referring now to FIG. 3, there is shown an example method 300 for determining an estimated weight of a vehicle according to the present disclosure. As shown, the method 300 may comprise receiving vehicle data (302), identifying one or more vehicle maneuvers that are each associated with a portion of the vehicle data (304), and using at least one machine learning model to determine an estimated weight of a vehicle based on the portion of the vehicle data associated with each of the one or more vehicle maneuvers (306). As will be appreciated, the method 300 may be implemented using any suitable systems and/or devices, such as those illustrated in FIG. 1 and FIG. 2. For example, the method 300 may be implemented by the fleet management system 110, one or more of the telematics devices 130, or a combination thereof. In more detail, the method 300 may be implemented by operating at least one processor of the fleet management system 110 and/or telematics devices 130, such as the processor 112 and/or the processor 132, to execute instructions stored on the data storage 114 and/or the data storage 134.

In embodiments where the method 300 is implemented by the fleet management system 110 (i.e., remote from the telematics device 130 and vehicle 120), less data processing may be completed at the telematics devices 130. As a result, the hardware complexity of the telematics devices 130 may be reduced, which, in turn, may lower the cost to produce the telematics devices 130. As well, it may be easier to update and/or modify software running on the fleet management system 110 as compared to a telematics device 130 that has already been installed in the vehicle 120. However, in embodiments where the method 300 is implemented at the telematics devices 130 (i.e., remote from the fleet management system 110), less data may be transmitted to the fleet management system 110, thereby reducing network usage and bandwidth on the network 140. As will be appreciated, usage costs associated with the network 140 may in turn also be reduced. Thus, the method 300 may be implemented in a variety of ways and each implementation may have advantages associated therewith.

As shown in FIG. 3 at 302, vehicle data associated with a vehicle (e.g., the vehicle 120) may be received. For example, in the context of the devices and systems described herein, the telematics device 130 may receive vehicle data from the sensor 138, vehicle components 122, or a combination thereof. Alternatively, or additionally, the fleet management system 110 may receive vehicle data from the telematics device 130. Alternatively, or additionally, the processor 112 and/or the processor 132 may receive vehicle data from the data storage 114 and/or the data storage 134.

The vehicle data may comprise a plurality of vehicle parameters collected during operation of the vehicle 120. As described herein, the vehicle data may include any information, parameters, attributes, characteristics, and/or features associated with the vehicle 120 and may vary depending on, for example, the intended uses therefor. Non-limiting examples of vehicle data that may be collected include geospatial data and engine data. As described herein, geospatial data may include, but is not limited to, speed data, acceleration data, elevation data, location data, and the like. Engine data may include, but is not limited to, torque data, gear ratio data, gear change data, rotational data, and the like.

Speed data may represent the velocity, or rate of locational change, of the vehicle 120. Speed data may be obtained from a vehicle speed sensor (VSS), for example, located in the powertrain and/or ABS of the vehicle 120. Alternatively, or additionally, the speed data may be calculated based on changes in location data over time, for example, obtained by the sensor 138.

Acceleration data may indicate the acceleration, or the rate of change of speed, of the vehicle 120. The acceleration data may be obtained from an accelerometer of the vehicle 120 or the telematics device 130 (e.g., sensor 138). Alternatively, the acceleration data may be calculated based on the speed data. In more detail, the acceleration data may be determined using the following equation (where v2 is the velocity of the vehicle at time t2, and v1 is the velocity of the vehicle 120 at time t1):

$$\text{acceleration} = \frac{v_2 - v_1}{t_2 - t_1}$$

Location data may indicate the geographical location of the vehicle 120. Location data may be obtained from, for example, a GPS receiver of the telematics device 130 (e.g., the sensor 138) or the vehicle 120. As will be appreciated, location data may indicate an exact or approximate location of a vehicle 120, distances travelled by the vehicle, routes travelled by the vehicle 120, and the like.

Elevation data may indicate the altitude, or distance above sea level, of the vehicle 120. The elevation data may be calculated using location data, for example, obtained from the sensor 138. In more detail, the elevation data may be determined by correlating the location data with topographic data. Alternatively, the elevation data may be obtained from an altimeter of the telematic device 130 (e.g., the sensor 138) or the vehicle 120.

Torque data may represent the rotational force output of the vehicle 120. As will be appreciated, the torque data may be in units of torque and/or a percentage of maximum torque. The torque data may include engine torque data, representing the torque output of the engine of the vehicle 120, and/or wheel torque data, representing the torque output at the wheels of the vehicle 120. Engine torque data may be obtained from the engine of the vehicle 120, for example, by an internal sensor, ECU, or a combination thereof. Wheel torque data may be calculated based on the engine torque data and gear ratio data. For example, wheel torque data may be determined using the following equation:

$$\text{wheel torque} = \text{effective gear ratio} \times \text{engine torque}$$

Gear ratio data may represent the effective gear ratio, or ratio between rate of rotational output at the engine and at the wheels, of the vehicle 120. The gear ratio data may be calculated based on rotational or rpm data of the vehicle 120. For example, the effective gear ratio may be determined using the following equation:

$$\text{effective gear ratio} = \frac{\text{engine } rpm}{\text{wheel } rpm}$$

Alternatively, the gear ratio data may be calculated based on the transmission ratio (ie) and differential ratio (id) of the vehicle 120. In more detail, the effective gear ratio may be calculated using the following equation:

$$\text{effective gear ratio} = i_e i_d$$

As indicated herein, rotational data may represent the rotational speed, or rpm, generated by the vehicle 120. The rotational data may include engine rotational data, representing the rpm of the engine, and/or wheel rotational data, representing the rpm of the wheels of the vehicle 120. The engine rotational data may be obtained from, for example, a crankshaft position sensor of the vehicle 120, while wheel rotational data may be calculated using the speed data of the vehicle 120 and the circumference of the wheels. For example, the wheel rotational data may be obtained using the following equation:

$$\text{wheel } RPM = \frac{\text{vehicle speed}}{\text{wheel circumference}}$$

In some embodiments, the vehicle data may be preprocessed prior to and/or subsequently to being received. For example, the vehicle data may be received in one or more various formats, standards, or protocols. In some cases, it may be beneficial to reformat the vehicle data prior to being used for weight estimation. As a further example, the vehicle data may include data points that correspond to irregular and/or mismatched points in time. In such situations, the vehicle data may be interpolated so that the data points in each time series correspond to successive and/or equally spaced points in time. As a yet further example, the vehicle data may be curve logged, which, as will be appreciated, may result in a reduced number of data points. In such configurations, the reduced number of data points may be interpolated to provide a fulsome dataset.

As shown in FIG. 3 at 304, one or more vehicle maneuvers based on the vehicle data may be identified. The one or more vehicle maneuvers may be identified by, for example, the fleet management system 110 (e.g., the processor 112), the telematics device 130 (e.g., the processor 132), or a combination thereof. Each vehicle maneuver may be associated with a portion of the vehicle data. For example, each vehicle maneuver may be associated with a portion of vehicle data comprising geospatial data, engine data, or a combination thereof. As described herein, the geospatial and/or engine data may include, but are not limited to, speed data, acceleration data, location data, elevation data, torque data, gear ratio data, gear change data, rotational data, etc.

The one or more vehicle maneuvers may be identified based on the vehicle data. In more detail, vehicle maneuvers may be identified by identifying portions of the vehicle data that satisfy one or more predetermined conditions. The predetermined conditions may include the execution of various actions by the vehicle 120. For example, the predetermined conditions may include, but are not limited to: vehicle propulsion, wherein the vehicle 120 is being actively propelled or driven; non-turning of the vehicle 120, wherein the vehicle 120 travels in a substantially straight trajectory without turning; non-braking of the vehicle 120, wherein the vehicle 120 is not actively braking or decelerating; changes in elevation of the vehicle 120, wherein the elevation changes may be more or less than a predetermined value; the speed of the vehicle 120 being greater or less than a predetermined value; the effective gear ratio of the vehicle 120 being greater or less than a predetermined value; and the like. Thus, vehicle maneuvers may represent an action performed, or an event experienced, by the vehicle 120 (e.g., an acceleration maneuver, wherein the vehicle 120 is determined to be accelerating).

Figure 4A:
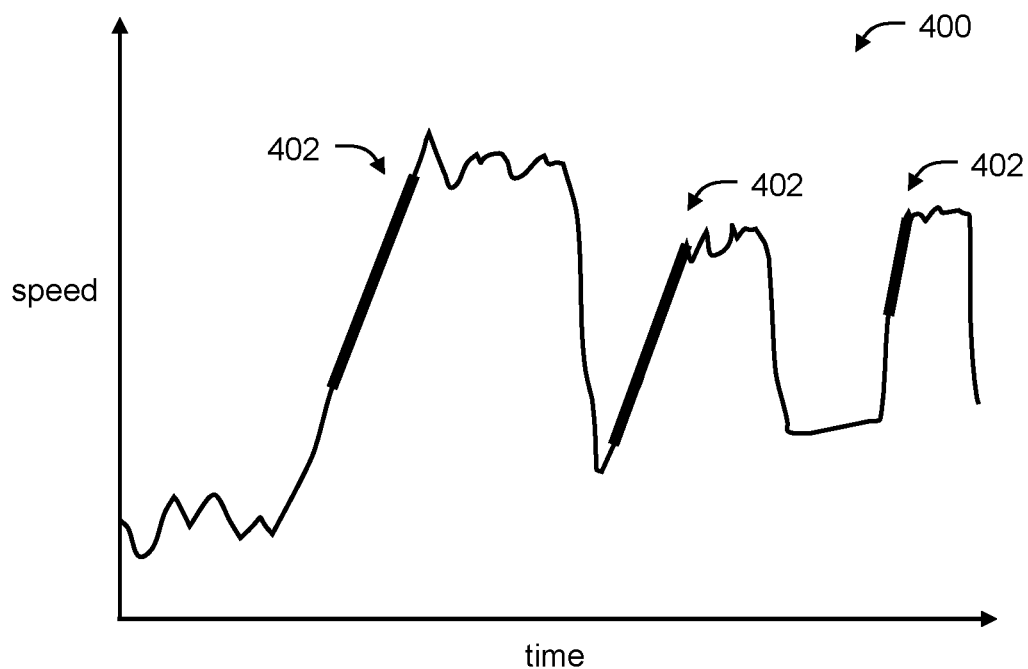
FIG. 4A is a graph of example speed data containing a plurality of example measured speed profiles according to an embodiment of the present disclosure.
Figure 4B:
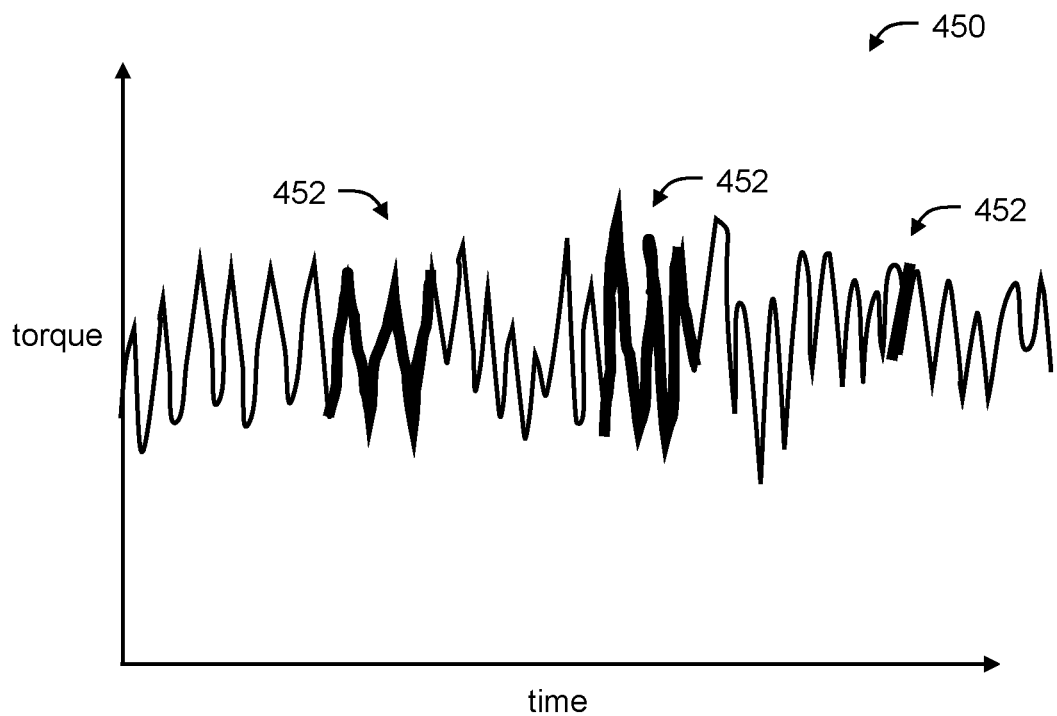
FIG. 4B is a graph of example torque data containing a plurality of example measured torque profiles according to an embodiment of the present disclosure.

Referring now to FIG. 4A and FIG. 4B, example speed data 400 and example torque data 450 are shown, respectively. In the context of the present disclosure, vehicle data associated with a vehicle maneuver may be referred to generally as a vehicle parameter profile. Specific types of vehicle parameter profiles include, for example, speed profiles, torque profiles, etc. As shown, portions of the speed data 402 (i.e., measured speed profiles) and portions of the torque data 452 (i.e., measured torque profiles) may be identified as vehicle maneuvers. In the illustrated example, the vehicle maneuvers correspond to portions of the vehicle data received while the vehicle 120 was in acceleration (i.e., being actively propelled or driven). Various measured speed profiles 402 and measured torque profiles 452 that satisfy such conditions may be identified as vehicle maneuvers.

The types of vehicle maneuvers to be identified may be selected based on potential similarities or differences between the vehicle data of vehicles of different weights. For example, the vehicle data received from a 1,500 kg vehicle may differ significantly from that of a 3,000 kg vehicle during certain vehicle maneuvers. Further, the vehicle maneuvers may be selected to reduce the impact of certain variables on the received vehicle data. For example, by selecting acceleration maneuvers occurring between speeds of about 20 km/h to about 80 km/h, the impact of certain physical variables (e.g., gear-box drag coefficients) and/or environmental variables (e.g., wind resistance) may be reduced or mitigated.

As described herein, each identified vehicle maneuver has associated therewith a portion of vehicle data. As will be appreciated, each portion of vehicle data associated with an identified vehicle maneuver may include a plurality of vehicle data types. For example, referring to FIG. 4A and FIG. 4B, corresponding portions of speed data 402 and torque data 452 (i.e., speed and torque data received during the same acceleration maneuver) may be included in the overall portion of vehicle data associated with the vehicle maneuver. That is, while an identified vehicle maneuver may be identified using a certain type of vehicle data, the portion of vehicle data associated with the identified vehicle maneuver may comprise other vehicle data received during the identified vehicle maneuver. The other data included in the portion of vehicle data may be used in the estimation of the weight of the vehicle.

As will be appreciated, each identified vehicle maneuver may differ in duration. As a result, it may in some cases be useful to normalize the portion of vehicle data associated with each identified vehicle maneuver. For example, for acceleration maneuvers, it may be useful to normalize the portions of vehicle data associated therewith by the distance traveled during the identified maneuvers. That is, the portions of vehicle data may be divided by the distance travelled during the identified acceleration maneuvers to provide normalized portions of vehicle data. Of course, other normalization techniques are possible and are contemplated. Thus, in some embodiments, the identifying of the one or more vehicle maneuvers based on the vehicle data may further comprise normalizing each portion of vehicle data associated with each of the one or more vehicle maneuvers.

Further, it may in some cases be desirable to filter identified vehicle maneuvers. In more detail, while vehicle maneuvers may be identified by meeting one or more predetermined conditions, it may be useful to remove one or more of the identified maneuvers that may not provide useful information. For example, while an acceleration maneuver may be identified for the vehicle 120 based on the vehicle data thereof, it may be the case that the speed of the vehicle 120 was increasing due to the vehicle travelling downhill rather than the operation of the engine thereof. As a result, the other data included in the portion of vehicle data associated with the identified vehicle maneuver may not be useful. Thus, in that example, acceleration maneuvers associated with a decrease in elevation and a comparatively low number of gear changes may be filtered out and not included in the methods and systems of determining an estimated vehicle weight described herein. As will be appreciated, suitable vehicle maneuver filters may comprise one or more predetermined thresholds that an identified vehicle maneuver must meet to be used in the systems and methods described herein. As well, a plurality of vehicle maneuver filters may be applied if so desired. Thus, in some embodiments, the identifying of the one or more vehicle maneuvers based on the vehicle data may further comprise filtering the one or more vehicle maneuvers based on the portion of vehicle data associated therewith.

Referring back to FIG. 3, as shown at 306, the estimated weight of the vehicle may be determined. As described herein, each portion of data associated with the one or more vehicle maneuvers may include a variety of vehicle data received during each vehicle maneuver, which may be used to estimate the weight of the vehicle. In some embodiments, each portion of vehicle data may comprise geospatial data, vehicle engine data, or a combination thereof. As described herein, geospatial data may comprise, but is not limited to, speed data, acceleration data, elevation data, and location data. Vehicle engine data may comprise, but is not limited to, gear change data, torque data, gear ratio data, and rotational data.

A machine learning model may be used to determine an estimated weight of the vehicle based on each portion of vehicle data associated with the one or more vehicle maneuvers. The machine learning model may be any suitable model including, but not limited to, a supervised learning model, an unsupervised learning model, a semi-supervised learning model, a reinforcement learning model, a deep neural network, etc. Examples of suitable machine learning models include models such as Random Forest (RF), AutoInt, an Autoencoder (AE), Tabnet, an AE+RF model, a TabNet+AutoInt model, etc.

Figure 5A:
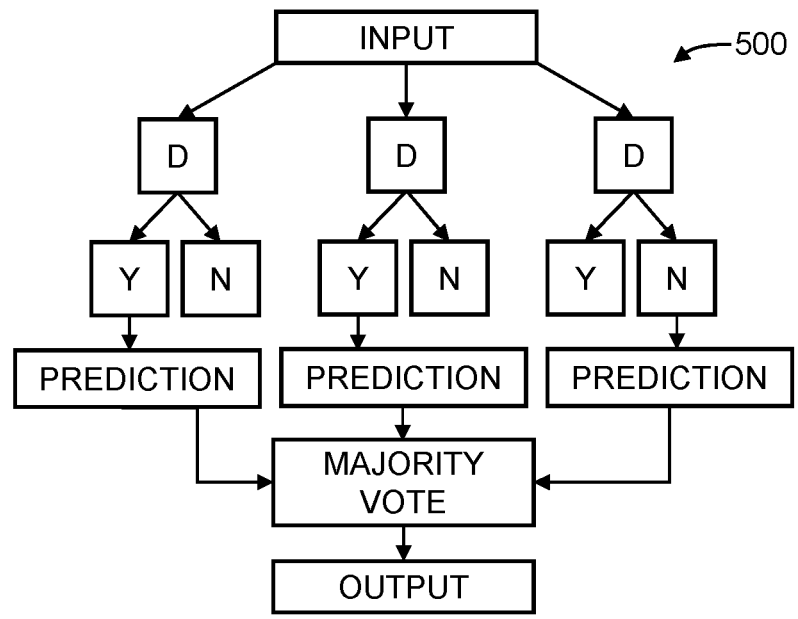
FIG. 5A is a flowchart of a simplified example of a Random Forest machine learning model.

In more detail, as will be appreciated, a Random Forest (RF) model is an ensemble machine learning model that builds decision trees on random subsets of input data that are subsequently merged (e.g., by majority vote) to provide a predicted output. Generally, building uncorrelated decision trees on random subsets of input data may be useful for reducing variance when predicting outcomes. For illustrative purposes, a simplified example of an RF model is shown in FIG. 5A. As shown, an RF model 500 includes a plurality of decision trees (indicated by "D") that produce a prediction (in the illustrated example, either a "Y" for "yes" or a "N" for "no"). The predictions may then be aggregated, for example, by way of a majority vote to determine a predicted output.

Figure 5B:
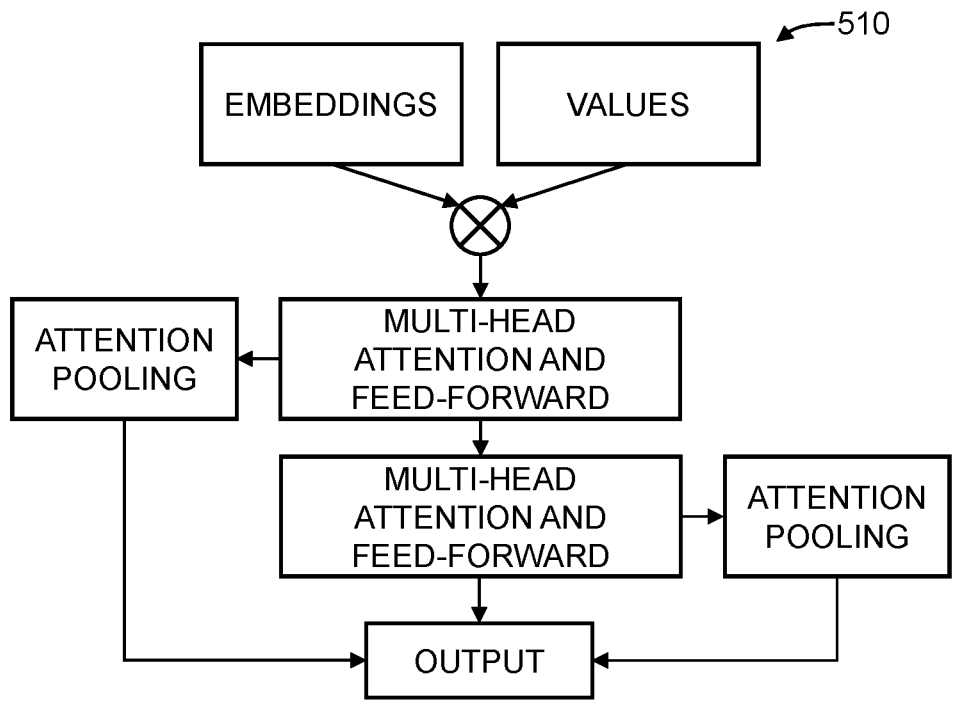
FIG. 5B is a flowchart of a simplified example of an AutoInt machine learning model.

An AutoInt model refers to a deep tabular machine learning model that is capable of automatically learning high-order interactions of input data. Generally, an AutoInt model operates by mapping numerical and/or categorical features into a low-dimensional space, after which a multi-head self-attentive neural network with residual connections models the data interactions in the low-dimensional space. Using a plurality of layers of the multi-head self-attentive neural network, a plurality of different orders of data combinations may be modeled. AutoInt models may include attention pooling at one or more of the layers of the multi-head self-attentive neural network so that single vector representations of data may be extracted. For illustrative purposes, an example of a simplified AutoInt model 510 is shown in FIG. 5B. As shown, data values and data embeddings (e.g., embedded, non-numerical data) may be input into the AutoInt model and subjected to a plurality of multi-head attention and feed-forward layers to produce an output. As also shown, attention pooling may be used at each layer of the model to extract, for example, a single vector from the data embeddings. The attention poolings may reduce the likelihood of the model overfitting the data and may result in faster data convergence by reducing the number of parameters the model has to learn.

Figure 5C:
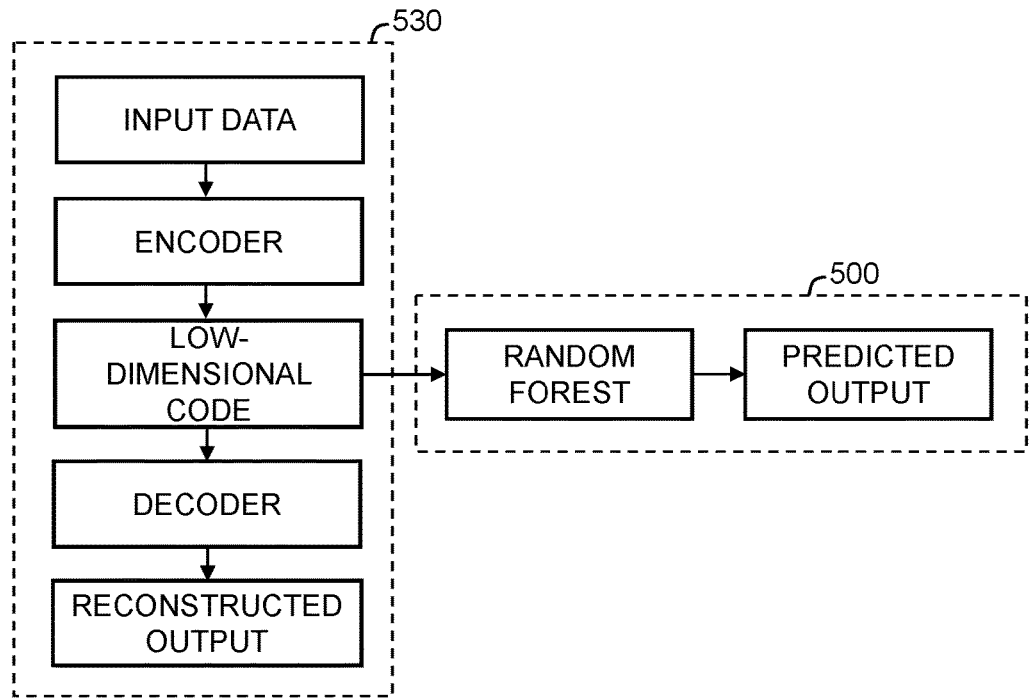
FIG. 5C is a flowchart of a simplified example of a AutoEncoder+Random Forest machine learning model.

AutoEncoder (AE) models generally refer to unsupervised feed-forward neural networks where the input data is the same as the output data. AE models are often used to reduce the noise and/or dimensionality of a dataset. Generally, an AE model may encode input data by compressing the input data into a lower-dimensional code (sometimes referred to as "latent variables") and then reconstructing, or decoding, the encoded data from the lower-dimensional dataset. In the context of the present disclosure, an AE model may be combined with supervised machine learning models such as those described above. A simplified example of such a configuration is illustrated in FIG. 5C, which depicts an AE+RF model. As shown, an AE model 530 may feed the lower-dimensional code into the RF model 500, which provides a predicted output.

Figure 5D:
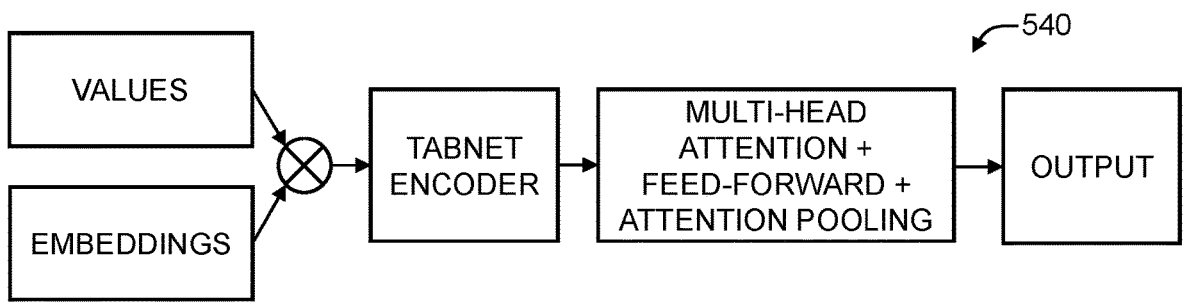
FIG. 5D is a flowchart of a simplified example of an AutoInt+TabNet machine learning model.

TabNet models generally employ instance-wise sequential attention to select data at each decision step using deep learning architecture. As will be appreciated, TabNet models may use structured or tabular data as inputs and are capable of predicting uncorrupted outputs from corrupted inputs. As a result, TabNet models may also be used in conjunction with other models. One such example is illustrated in FIG. 5D, which depicts a TabNet+AutoInt model 540. As shown, a TabNet encoder may be included in an AutoInt model to encode the data values and data embeddings prior to subjection to the multi-head attention and feed-forward layers of the AutoInt model.

The at least one machine learning model is trained using vehicle data (i.e., training data) associated with a plurality of previous vehicle maneuvers. The training data associated with the plurality of previous vehicle maneuvers may comprise portions of vehicle data associated with each of the previous vehicle maneuvers. As will be appreciated, the at least one machine learning model may be trained by using labelled training data, unlabelled training data, or a combination thereof associated with previous vehicle maneuvers. Generally, supervised machine learning models may be trained using labelled data, semi-supervised machine learning models may be trained using a combination of labelled and unlabelled data, and unsupervised machine learning models may be trained using unlabelled data. In the context of the present disclosure, labelled data may include vehicle data associated with an indication of vehicle weight (e.g., a measured vehicle weight or load state, a predicted vehicle weight or load state, etc.) while unlabelled data may include vehicle data that is not associated with any indication of vehicle weight.

The plurality of previous vehicle maneuvers may comprise previously identified vehicle maneuvers. For example, prior to the implementation of the methods and systems of the present disclosure, the fleet management system 110 (e.g., the processor 112), the telematics device 130 (e.g., the processor 112), or a combination thereof may identify a plurality of vehicle maneuvers from a plurality of vehicles 120 using the techniques previously described herein, each of which has associated therewith a portion of vehicle data. The portions of vehicle data associated with the plurality of identified vehicle maneuvers may then be stored on, for example, the data storage 112, the data storage 132, one or more other data storages, or a combination thereof. The plurality of previously identified vehicle maneuvers will generally be the same type or types of vehicle maneuvers selected to be identified in the systems and methods of the present disclosure. For example, if acceleration maneuvers are to be identified, the previous vehicle maneuvers may comprise previously identified acceleration maneuvers. The stored portions of vehicle data associated with the identified vehicle maneuvers may then be input into the at least one machine learning model as training data to train the at least one machine learning model (e.g., prior to the implementation of the methods or systems of the present disclosure).

As described above, depending on the machine learning model or models used, it may be desirable to label at least a portion of the training data associated with the previous vehicle maneuvers prior to training the at least one machine learning model. As described herein, it may be useful to label the training data with an indication of the weight of the vehicle or vehicles performing the previously identified maneuvers. For example, a suitable label may include a predicted vehicle weight value or range, and/or an indication of the load state of the vehicle. The labelling of the training data may be completed manually or using computational methods. As will be appreciated, for large data sets, manual labelling may not be desirable.

Examples of suitable methods for labelling training data to be used for training the at least one machine learning model for use in the systems and methods of the present disclosure are discussed below. In one example, the fleet management system 110 (e.g., processor 112) and/or telematics device 130 (e.g., processor 132) may generate simulated vehicle parameter profiles using a vehicle dynamics model. As will be appreciated, the vehicle dynamics model may be any suitable model for simulating the operation of a vehicle. For example, the vehicle dynamics model may be a model generated using various modeling or simulation software such as MapleSim™, Simulink™, SystemModeler™, Dymola™, SimulationX™, and the like. As well, or alternatively, the vehicle dynamics model may be a functional mock-up unit (FMU) and/or a functional mock-up interface (FMI) that may interface with other software.

The vehicle dynamics model may generate the simulated vehicle parameter profiles based on various input data. The input data may include various vehicle data, other data, or a combination thereof. For example, the input data for each vehicle maneuver may include the portion of the vehicle data associated with the respective one or more vehicle maneuvers such as, but not limited to, geospatial data and/or engine data. The input data may also include a plurality of candidate vehicle weights. Each candidate vehicle weight may represent a presumed or putative weight of the vehicle. In such configurations, each simulated vehicle parameter profile may correspond to one of the candidate vehicle weights. Accordingly, each simulated vehicle parameter profile may represent a simulation or a prediction of the vehicle data that could be measured during a vehicle maneuver if the vehicle weight was the candidate vehicle weight.

Figure 6:
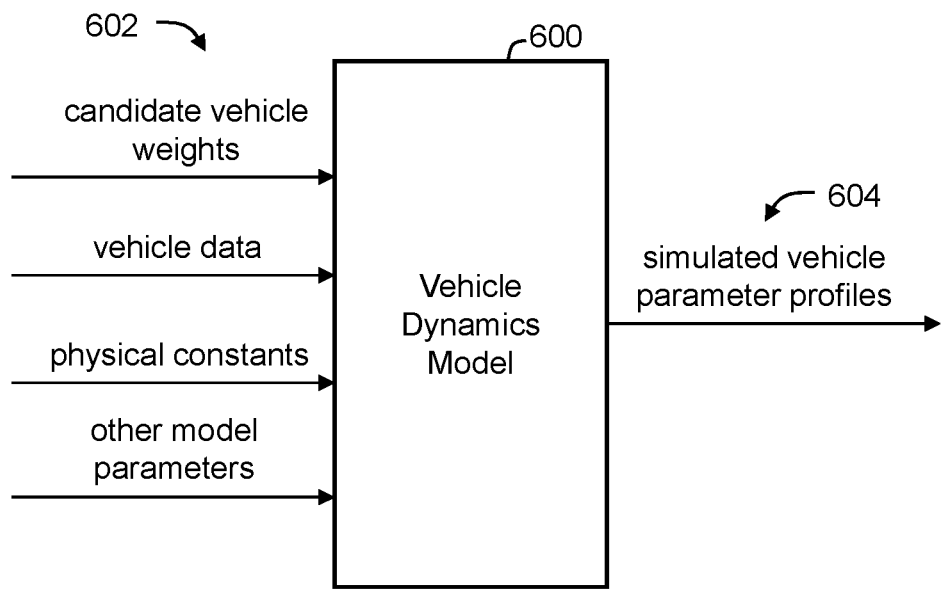
FIG. 6 is a block diagram of an example vehicle dynamics model according to an embodiment of the present disclosure.

An example is illustrated in FIG. 6, which depicts an example vehicle dynamics model 600. As shown, the vehicle dynamics model may receive various input data 602 and generate simulated vehicle parameter profiles 604 (e.g., simulated speed profiles, simulated torque profiles, etc.) based on the input data 602. In the illustrated example, the input data includes candidate vehicle weights, vehicle data, physical constants, and other model parameters. As described herein, the candidate vehicle weights may represent presumed or putative weights of the vehicle 120. The vehicle data may include various vehicle data associated with the corresponding vehicle maneuvers, such as, but not limited to, measured geospatial and/or engine data. The physical constants may include various physical coefficients, parameters, and/or constants that may be used by the vehicle dynamics model 600, such as, but not limited to, wheel radii, vehicle cross-sectional dimensions, drag coefficients, roll coefficients, and the like. The other model parameters may include auxiliary or secondary parameters that are specific to the vehicle dynamics model 600. For example, the other model parameters may include proportional integral derivative (PID) controller parameters that may be used to adjust the sensitivity of the vehicle dynamics model 600.

Figure 7A:
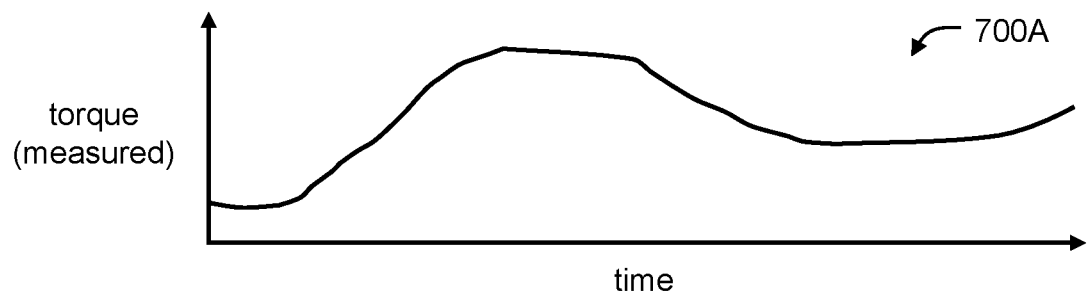
FIG. 7A is a graph of an example measured torque profile according to an embodiment of the present disclosure.
Figure 7B:
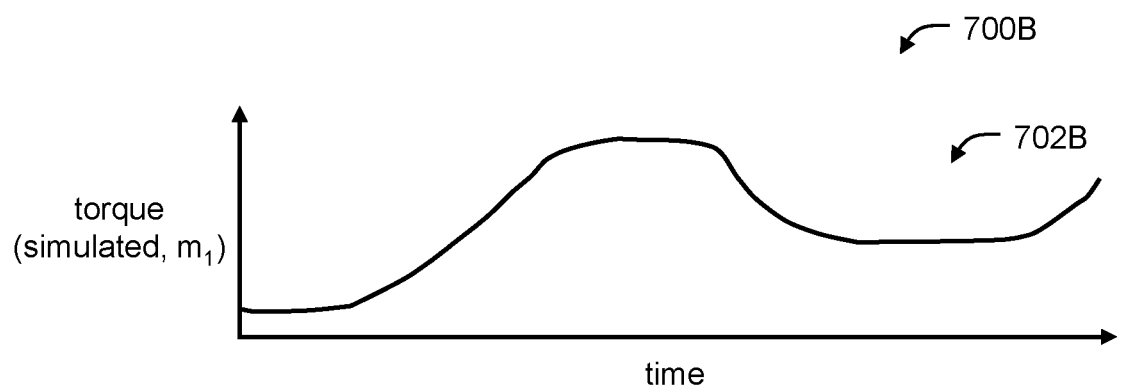
FIG. 7B is a plurality of graphs of a plurality of example simulated torque profiles corresponding to a plurality of example candidate vehicle weights according to an embodiment of the present disclosure.
Figure 7B:
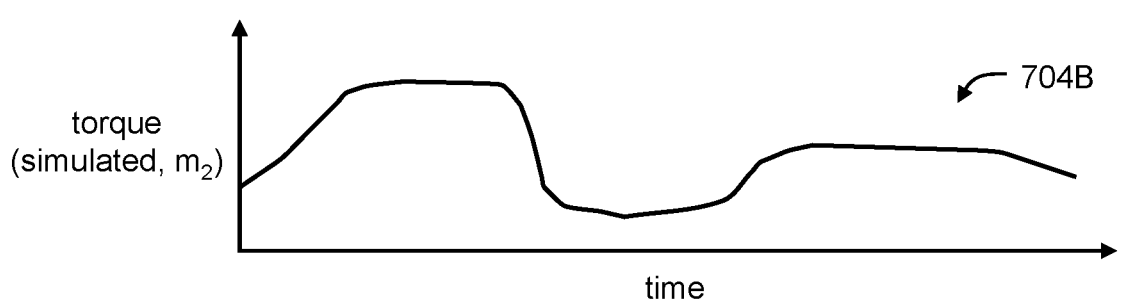
Figure 7B:
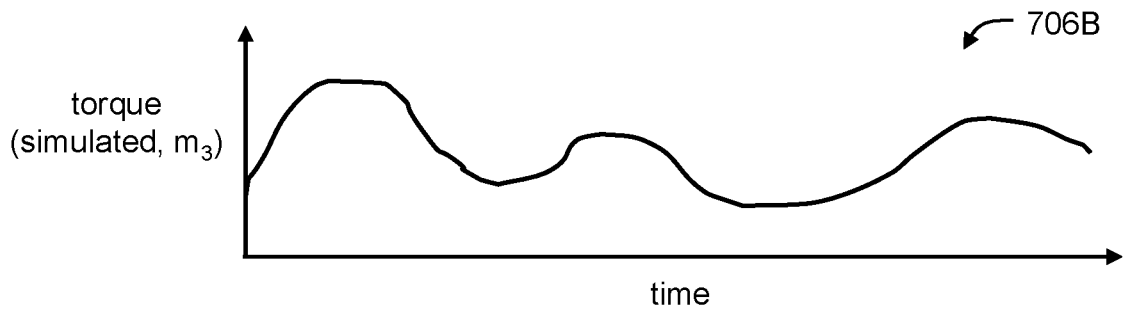

FIG. 7A and FIG. 7B show, respectively, a measured vehicle parameter profile and a plurality of simulated vehicle parameter profiles generated by the vehicle dynamics model 600 corresponding to a vehicle maneuver. In the illustrated example, the measured vehicle parameter profile is a measured torque profile 700A and the plurality of simulated vehicle parameter profiles are simulated torque profiles 700B. However, as described herein, the measured and simulated vehicle parameter profiles may include any suitable vehicle data. As well, the measured and simulated vehicle parameter profiles may be associated with any desired vehicle maneuver. For example, in the illustrated embodiment, the measured torque profile 700A and the simulated torque profiles 700B are associated with an acceleration maneuver.

Using a measured vehicle parameter profile and one or more simulated vehicle parameter profiles, an error profile may be generated (e.g., by the processor 112 of the fleet management system 110 and/or by the processor 132 of the telematics device 130) for the corresponding vehicle maneuver. An error profile may be generated for the vehicle maneuver based on differences between the measured vehicle parameter profile and the one or more simulated vehicle parameter profiles. For example, an error profile may be generated based on the differences between the measured torque profile 700A and the plurality of simulated torque profiles 700B.

Further, the simulated vehicle parameter profiles may correspond to one or more candidate vehicle weights. In the illustrated example, the simulated torque profiles 700B correspond to a plurality of candidate vehicle weights (m1, m2, m3). Each simulated torque profile may correspond to a different one of the candidate vehicle weights. For example, in the illustrated embodiment, a first simulated torque profile 702B corresponds to a first candidate vehicle weight (m1), a second simulated torque profile 704B corresponds to a second candidate vehicle weight (m2), and a third simulated torque profile 706B corresponds to a third candidate vehicle weight (m3). Thus, each error profile generated using the measured torque profile 700A and each of the simulated torque profiles 700B may represent the error of each candidate vehicle weight.

Figure 8:
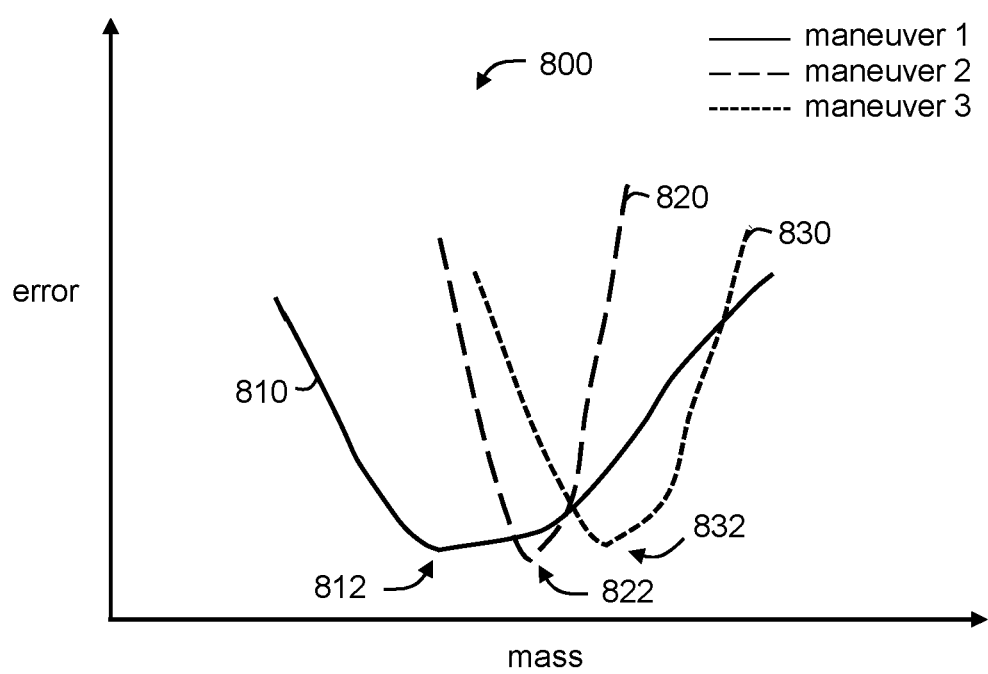
FIG. 8 is a graph of a plurality of example error profiles according to an embodiment of the present disclosure.

Referring now to FIG. 8, there is shown a plurality of example error profiles 800 for the measured torque profile 700A and the simulated torque profiles 700B for the associated vehicle maneuver. As shown, each error profile may correspond to a particular vehicle maneuver. For example, in the illustrated embodiment, a first error profile 810 corresponds to a first vehicle maneuver (maneuver 1), a second error profile 820 corresponds to a second vehicle maneuver (maneuver 2), and a third error profile 830 corresponds to a third vehicle maneuver (maneuver 3). As described herein, since each simulated torque profile 700B may correspond to a particular candidate weight, each error profile 800 may represent the error of each candidate vehicle weight for a particular vehicle maneuver.

The differences between the simulated torque profiles 700B and the measured torque profiles 700A may be determined using any suitable technique. For example, the differences may correspond to differences between the area under the curve of each of the simulated torque profiles 700B and the area under the curve of the measured torque profile 700A. The differences may be the mean square error of the differences of the respective areas under the curves. An advantage of determining the differences in this manner is that noise and/or other errors in the vehicle parameter profiles may have less of an effect on the area under the curve as compared to the vehicle parameter profile itself.

Once determined, the error profiles may be used to provide a predicted vehicle weight. For example, the error profiles may be minimized and/or averaged to predict a candidate vehicle weight for a vehicle maneuver with a lowest associated error. In more detail, as shown in FIG. 8, each error profile 800 may have a minimum that corresponds to a particular candidate vehicle weight. In the illustrated example, a first error profile 810 has a minimum 812, a second error profile 820 has a minimum 822, and a third error profile 830 has a minimum 832. The candidate vehicle weights that minimize the error profiles 800 (i.e., at minimums 812, 822, and 832) may be identified and used to predict the weight of the vehicle 120. Thus, each error profile 800 may represent a grid search for a candidate vehicle weight that minimizes the error between the simulated torque profiles 700B and the measured torque profiles 700A.

Once identified, the candidate vehicle weights that minimize the error profiles may be averaged to provide a predicted vehicle weight. In more detail, and with reference to the illustrated example, the candidate vehicle weights corresponding to the minimums 812, 822, and 832 may be averaged to determine a predicted weight of the vehicle. In some embodiments, the average of the candidate vehicle weights may be a weighted average, wherein the candidate vehicle weights may be assigned different weights based on the corresponding error profile. For example, the candidate vehicle weights may be weighted based on a sensitivity of the corresponding error profiles 800. The sensitivity of an error profile 800 may correspond to the slope or rate of change of that error profile 800. An error profile with a greater slope may be considered more sensitive than an error profile having a lower slope because a greater slope may represent a large change in error in response to a small change in candidate vehicle weight. Candidate vehicle weights corresponding to error profiles 800 having greater sensitivity may be given more weight than candidate vehicle weights corresponding to error profiles 800 having lower sensitivity. For example, the candidate vehicle weight identified from error profile 820 may be assigned greater weight than the candidate vehicle weights identified from error profiles 810 and 830.

The predicted vehicle weight for the previous vehicle maneuvers determined using the error profiles may then be used as a label for training data to direct the at least one machine learning model to associate the vehicle data of a particular vehicle maneuver with a particular vehicle weight. In some embodiments, the previous vehicle maneuvers selected for use as training data are labelled with a predicted weight having an error less than a particular maximum. For example, the previous vehicle maneuvers used to train the at least one machine learning model may be labelled with a predicted vehicle weight having an error less than 25%, 20%, 15%, 10%, 5%, etc. Such embodiments may be useful, as previous vehicle maneuvers having predicted vehicle weights with relatively less error may indicate a more accurate training dataset. As will be appreciated, the level of error selected to be acceptable may depend at least in part on the size of the previous vehicle maneuver dataset available.

As described above, the previous vehicle maneuvers may also or alternatively be labelled with a load state prior to use as training data for the at least one machine learning model. In the context of the present disclosure, the load state of a vehicle is an indication of whether the vehicle is loaded with cargo. The load state of a vehicle may also indicate whether the vehicle is excessively loaded (or "overloaded"). For the previous vehicle maneuvers, the load state of the vehicle that performed the maneuvers may be predicted using a predicted weight therefor. For example, if the weight of a vehicle 120 is predicted to be above a predetermined weight threshold (e.g., using the techniques described herein), the vehicle 120 may be considered to be loaded. If the weight of the vehicle 120 is predicted not to be above the predetermined weight threshold, the vehicle 120 may be considered to be unloaded. In some embodiments, the predetermined weight threshold may comprise a plurality of predetermined thresholds. For example, if the vehicle 120 is predicted to have a weight that exceeds both a first and a second predetermined weight threshold, the vehicle may be considered to be overloaded. Thus, examples of suitable labels for training data associated with the previous vehicle maneuvers include labels such as "unloaded", "loaded", and "overloaded".

As described herein, the training data used to train the at least one machine learning model may comprise portions of vehicle data associated with the previous vehicle maneuvers. The portions of vehicle data associated with the previous vehicle maneuvers may comprise vehicle data used to identify the previous vehicle maneuvers (e.g., prior to the implementation of the systems and methods of the present disclosure) as well as vehicle data that may be used to determine an estimated weight of the vehicle. For example, in embodiments where at least a portion of the training data is labelled, the portions of vehicle data may include types of vehicle data that inform the at least one machine learning model to estimate the weight of the vehicle, such as, but not limited to, vehicle data that is relevant to the type of vehicle maneuver identified, that is correlated to the label (e.g., negatively or positively correlated), that discriminates outliers, etc.

In more detail, the training data may comprise geospatial data, vehicle engine data, or a combination thereof from a duration of the one or more previous vehicle maneuvers. Examples of particular types of vehicle data that the training data may comprise include rotational data, torque data, energy data, speed data, elevation data, acceleration data, gear data, or a combination thereof. The training data may be raw vehicle data and/or processed vehicle data. Processed vehicle data may include raw vehicle data that has been manipulated or interpolated to provide additional information. Examples of processed data include mean data (e.g., averaged vehicle data from the duration of the vehicle maneuver), normalized data (e.g., normalized vehicle data from the duration of the vehicle maneuver), accumulated data, and differences in data over a select subsection of time (e.g., changes in vehicle data over a selected period of time during the vehicle maneuver). As will be appreciated, the training data may comprise both raw and processed vehicle data. For example, the training data may include raw speed data as well as mean speed data, normalized differences in speed data, differences in speed data over select subsections of time, etc.

As an example, if the previous vehicle maneuvers are acceleration maneuvers, the inventors of the present disclosure found that it may be useful for the training data to comprise vehicle data from the duration of the previous vehicle maneuvers such as a normalized accumulated RPM, a normalized accumulated torque, energy, a normalized difference in speed, a normalized difference in elevation, a mean acceleration, a normalized number of gear changes, a change in speed over a selected subsection of time, and a change in elevation over a selected subsection of time. Each of the selected subsections of time may independently be selected to correspond to, for example, an interval of time immediately after a vehicle maneuver is initiated such as a first 3 second interval of the vehicle maneuver. The vehicle data relating to speed, torque, acceleration, and energy were found to have a correlation (e.g., a positive or negative correlation) with weight-indicating labels such as predicted weights and/or predicted load states of the vehicles. The vehicle data relating to elevation and speed differences over a subsection of time were found to be useful in discriminating against outliers.

Of course, as will be appreciated, if the at least one machine learning model is to be trained using training data associated with previous vehicle maneuvers other than acceleration maneuvers, the training data may be different. That is, the types of vehicle data included in the training data may be different than that included for acceleration maneuvers.

Figure 9:
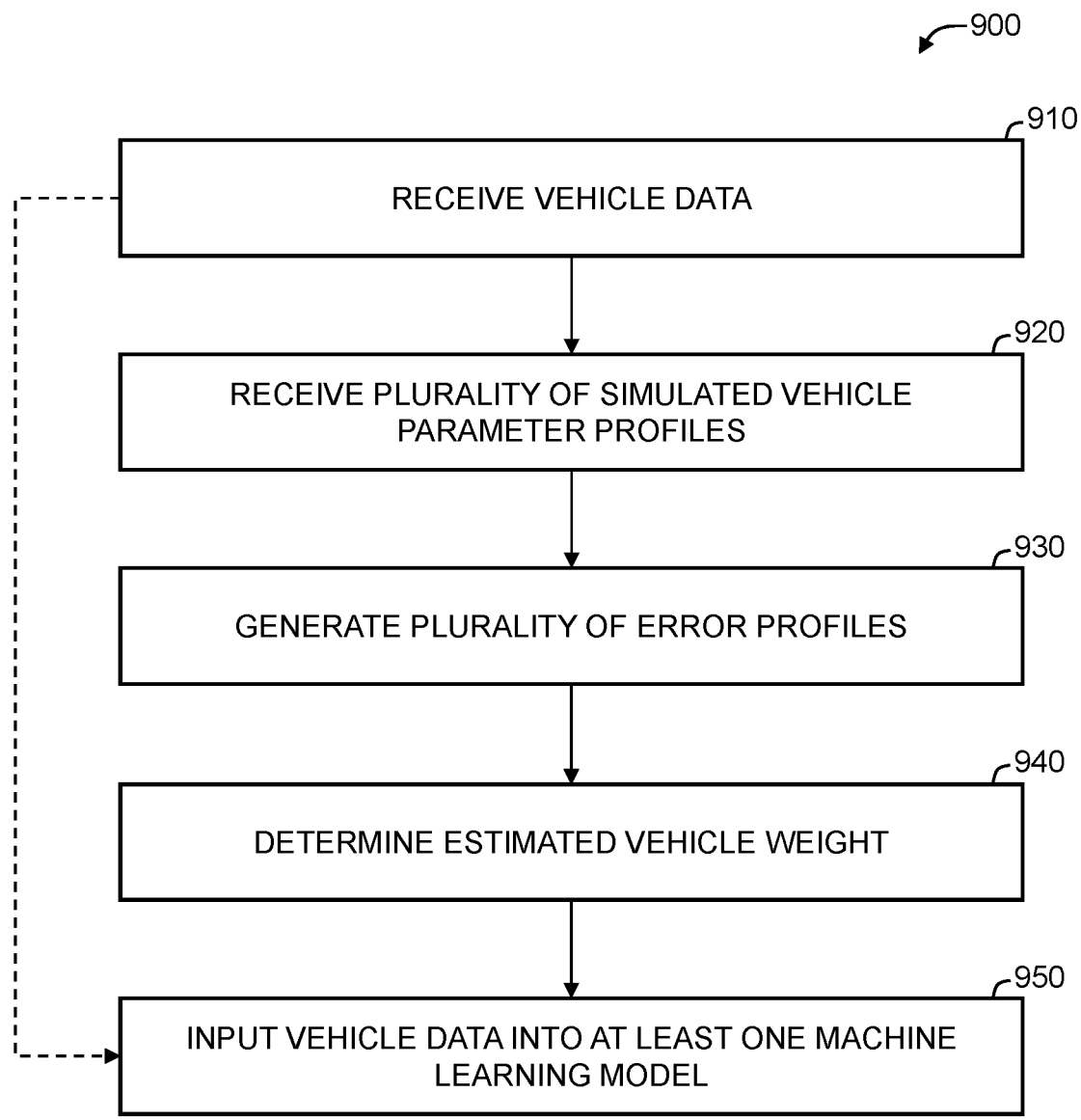
FIG. 9 is a flowchart of an example method of training at least one machine learning model according to an embodiment of the present disclosure.

For additional clarity, a method of training at least one machine learning model is shown in FIG. 9. As shown, the present disclosure also provides a method of training at least one machine learning model (900), the method comprising operating at least one processor to: receive vehicle data (910) associated with one or more vehicles, the vehicle data comprising a plurality of portions of vehicle data that are each associated with a vehicle maneuver and that each comprise a measured vehicle parameter profile; receive a plurality of simulated vehicle parameter profiles (920) for at least one measured vehicle parameter profile; generate a plurality of error profiles (930) based on differences between each of the at least one measured vehicle parameter profiles and the plurality of simulated vehicle parameter profiles; determine, using the plurality of error profiles, an estimated vehicle weight (940) associated with each of the at least one measured vehicle parameter profiles; and input the plurality of portions of vehicle data into the at least one machine learning model (950) to thereby train the at least one machine learning model to estimate a weight of a vehicle using the vehicle data associated therewith.

In more detail, at 910 in FIG. 9, vehicle data associated with one or more vehicles may be received. The vehicle data may be collected during operation of the one or more vehicles (e.g., using the sensor 138 of the telematics device 130, or other techniques described herein). The vehicle data may comprise portions of vehicle data that are each associated with a vehicle maneuver (e.g., an acceleration maneuver) and that each comprise a measured vehicle parameter profile. As described herein, the measured vehicle parameter profile may generally be associated with the vehicle maneuver. For example, if the portion of vehicle data is associated with an acceleration maneuver, the measured vehicle parameter profile may be a measured speed profile, a measured torque profile, etc. As described herein, the vehicle data may be received by, for example, the telematics device 130 from the sensor 138, the vehicle components 122, or a combination thereof. Alternatively, or additionally, the fleet management system 110 may receive vehicle data from the telematics device 130. Alternatively, or additionally, the processor 112 and/or the processor 132 may receive vehicle data from the data storage 114 and/or the data storage 134.

As shown in FIG. 9 at 920, a plurality of simulated vehicle parameter profiles may be received. As described herein, the simulated vehicle parameter profiles generally correspond to the at least one of the measured vehicle parameter received profiles of the portions of vehicle data. That is, the simulated vehicle parameter profiles may be generated for the same type of vehicle maneuver that is associated with the at least one measured vehicle parameter. The plurality of simulated vehicle parameter profiles may be generated using a vehicle dynamics model, as described herein. As will be appreciated, the simulated vehicle parameter profiles may be pre-generated in that the simulated vehicle parameter profiles are generated prior to their use in the systems and methods of the present disclosure. Further, the plurality of simulated vehicle profiles may be received by any suitable device and/or system. For example, the fleet management system 110 (e.g., the processor 112) and/or the telematics device 130 (e.g., processor 132) may receive each of the plurality of simulated vehicle parameter profiles (e.g., from the data storage 114 and/or data storage 134).

At 930 in FIG. 9, a plurality of error profiles based on differences between the at least one measured vehicle parameter profile and the plurality of simulated vehicle parameter profiles may be generated. For example, the fleet management system 110 (e.g., processor 112) and/or telematics device 130 (e.g., processor 132) may generate the error profiles. As described herein, the error profiles may be generated based on differences between the measured vehicle parameter profile and the plurality of simulated vehicle parameter profiles such as differences between the area under the curves of the simulated vehicle parameter profiles and the measured vehicle parameter profiles.

As shown in FIG. 9 at 940, an estimated vehicle weight associated with each of the at least one measured vehicle parameter profiles may be determined using the plurality of error profiles. For example, the estimated weight of the vehicle may be determined by the fleet management system 110 (e.g., processor 112) and/or telematics device 130 (e.g., processor 132) may determine the estimated weight of the vehicle 120. As described herein, the error profiles may be minimized and/or averaged to provide an estimated weight of the vehicle. For example, the estimated weight of the vehicle may be determined based on an average of candidate vehicle weights that minimize the error profiles, as described herein. As well, the candidate vehicle weights may be assigned difference weights based on the corresponding error profile. For example, the candidate vehicle weights may be weighted based on a sensitivity of the corresponding error profiles. The sensitivity of an error profile may correspond to the slope or rate of change of that error profile.

In some embodiments, the error profiles may determine whether a received portion of vehicle data is suitable for use to train the at least one machine learning model, as described herein. In more detail, the estimated weight of the vehicle may have error associated therewith that corresponds to the minimized and/or averaged error profiles. If the estimated weight of the vehicle has an error associated therewith that is above a selected value, it may in some cases be desirable to omit from the training data the portion of vehicle data comprising the measured vehicle profile used to estimate the weight of the vehicle. As will be appreciated, a lower associated error value may indicate that a portion of vehicle data may result in a more accurate training of the at least one machine learning model. A maximum allowable associated error may be selected based on, for example, the amount of vehicle data available to train the at least one machine learning model, the types of measured vehicle parameter profiles received, etc. Examples of maximum allowable associated error may include 25%, 20%, 15%, 10%, 5%, etc.

At 950 in FIG. 9, there is shown that the plurality of portions of vehicle data may be input into the at least one machine learning model to thereby train the at least one machine learning model to estimate a weight of a vehicle using the vehicle data associated therewith. That is, the portions of vehicle data may be used as training data for the at least one machine learning model. As described herein, the received portions of vehicle data may be used to direct the at least one machine learning model to associate specific portions of vehicle data (e.g., a measured vehicle parameter profile) related to particular types of vehicle maneuvers (e.g., acceleration maneuvers) with particular vehicle weights.

As also described herein, the training data may be labelled, partially labelled (i.e., a portion of the training data is labelled), or unlabelled. Thus, in some embodiments, the plurality of simulated vehicle parameter profiles may be received for each measured vehicle parameter profile. In such embodiments, each measured vehicle parameter profile is therefore compared to a plurality of simulated vehicle parameter profiles to generate the plurality of error profiles. An estimated vehicle weight may be determined and associated with each measured vehicle parameter profile and, as a result, the portions of vehicle data used to train the at least one machine learning model may be labelled with the estimated vehicle weight (e.g., a load state and/or a vehicle weight value).

However, in another embodiment, the training data may be unlabelled (e.g., for use with an unsupervised machine learning model). In such embodiments, the received vehicle data may be directly input into the at least one machine learning model without receiving the plurality of simulated vehicle profiles (920), generating the plurality of error profiles (930), and determining an estimated vehicle weight (940), as illustrated by the broken-line arrow in FIG. 9. In such embodiments, it may be useful to select the types of vehicle data or measured vehicle parameter profiles included in each portion of vehicle data. As described herein, the inventors the present disclosure found that it may be useful to include vehicle data (or measure vehicle parameter profiles) collected from a duration of a vehicle maneuver such as, but not limited to, a normalized accumulated RPM, a normalized accumulated torque, energy, a normalized difference in speed, a normalized difference in elevation, a mean acceleration, a normalized number of gear changes, a change in speed over a selected subsection of time, and a change in elevation over a selected subsection of time. Thus, in some embodiments, the method of training at least one machine learning model (900) may comprise operating at least one processor to: receive vehicle data (910) associated with one or more vehicles, the vehicle data comprising a plurality of portions of vehicle data that are each associated with a vehicle maneuver and that each comprise a measured vehicle parameter profile comprising a normalized accumulated RPM, a normalized accumulated torque, energy, a normalized difference in speed, a normalized difference in elevation, a mean acceleration, a normalized number of gear changes, a change in speed over a selected subsection of time, and a change in elevation over a selected subsection of time, or a combination thereof; and input the plurality of portions of vehicle data into the at least one machine learning model (950) to thereby train the at least one machine learning model to estimate a weight of a vehicle using the vehicle data associated therewith.

Of course, in some embodiments, the received vehicle data may be labelled. That is, in such embodiments, the received vehicle data is labelled vehicle data. The received labelled vehicle data may be directly input into the at least one machine learning model as described above in relation to the use of unlabelled training data to train the at least one machine learning model and as illustrated by the broken-line arrow. In some embodiments, the received labelled vehicle data may be input into the at least one machine learning model with unlabelled vehicle data (e.g., for a semi-supervised machine learning model).

Once the at least one machine learning model is trained, the at least one machine learning model may be used to determine an estimated weight of the vehicle based on the portion of vehicle data associated with each of the one or more identified vehicle maneuvers. As will be appreciated, the portions of vehicle data associated with the identified one or more vehicle maneuvers will generally comprise the same types of vehicle data included in the training data, such as those described above. By using the portion of vehicle data associated with each of the one or more vehicle maneuvers, the trained at least one machine learning model may classify the vehicle performing the one or more vehicle maneuvers as a particular weight, as within a particular weight range, or based on the predicted load state of the vehicle (e.g., unloaded, loaded, or overloaded).

Figure 10:
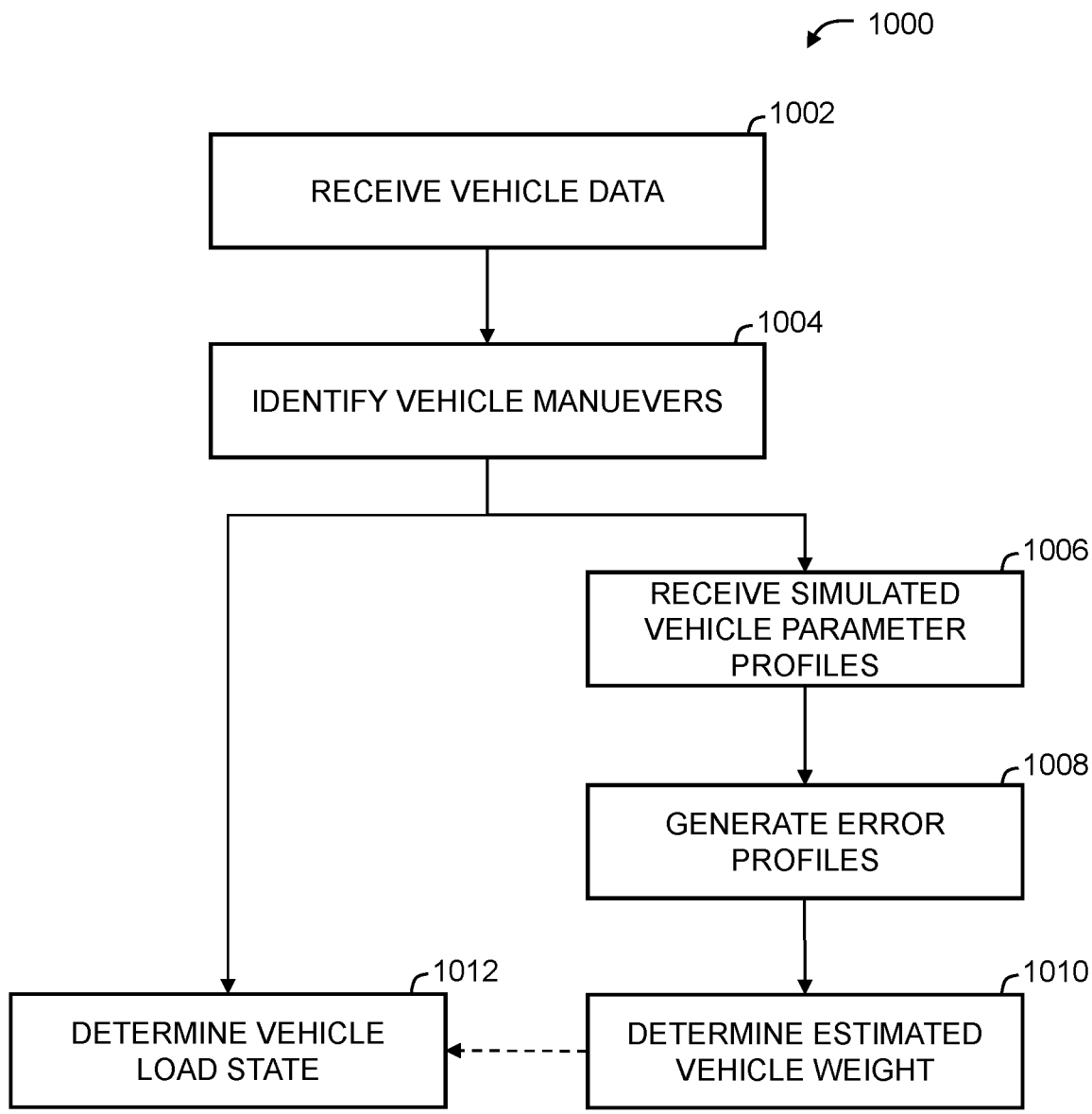
FIG. 10 is a flowchart of an example method for determining an estimated weight and load state of a vehicle according to an embodiment of the present disclosure.

In some embodiments, the methods of the present disclosure may involve determining an estimation of the weight and a load state of the vehicle. An example of such an embodiment is shown in FIG. 10, wherein the method 1000 comprises receiving vehicle data (1002) associated with the vehicle, identifying one or more vehicle maneuvers (1004) each having associated therewith a portion of the vehicle data, receiving a plurality of simulated vehicle parameter profiles (1006) for a previous vehicle maneuver, generating a plurality of error profiles (1008) for each vehicle maneuver, determining an estimated weight of the vehicle (1010) by minimizing the plurality of error profiles, and using at least one machine learning model to determine a load state (1012) of the vehicle based on the portion of vehicle data associated with each of the one or more vehicle maneuvers.

The steps 1002, 1004, and 1012 of the method 1000 may generally be performed in the same manner as the steps 1002, 1004, and 1006, respectively, of the method 300 described herein.

The steps 1006, 1008, and 1010 of the method 1000, may be generally performed using techniques described above in relation to labelling training data for the at least one machine learning model. For example, the received plurality of simulated vehicle parameter profiles may be for one of the previous vehicle maneuvers used to train the at least one machine learning model. The previous vehicle maneuver from which the simulated vehicle parameter profiles are to be generated may be selected using any suitable technique. For example, some or all of the vehicle data associated with the previous vehicle maneuver may be compared to corresponding vehicle data associated with the one or more identified vehicle maneuvers to determine the similarity between the previous vehicle maneuver and the one or more identified vehicle maneuvers. In such cases, if the previous vehicle maneuver is determined to be similar to the one or more identified vehicle maneuvers, the simulated vehicle parameter profiles may be received therefor. The similarity between the previous vehicle maneuvers and the one or more identified vehicle maneuvers may be evaluated using any suitable technique. For example, a vehicle parameter profile associated with the previous vehicle maneuver may be compared to a vehicle parameter profile associated with the one or more identified vehicle maneuvers by determining a similarity score therebetween. The similarity score may be determined using, for example, various matching algorithms such as dynamic time warping algorithms.

The simulated vehicle parameter profiles may be selected based on the type of vehicle maneuver to be used for estimating the weight of the vehicle. For example, if acceleration maneuvers are to be used vehicle parameter profiles such as speed profiles and/or torque profiles may be selected. The plurality of simulated vehicle parameter profiles may be generated for the previous vehicle maneuver using a vehicle dynamics model, as described herein. As will be appreciated, the simulated vehicle parameter profiles may be pre-generated in that the simulated vehicle parameter profiles are generated prior to their use in the systems and methods of the present disclosure.

The plurality of simulated vehicle parameter profiles for each previous vehicle maneuver may be received using any suitable device and/or system. For example, the fleet management system 110 (e.g., the processor 112) and/or the telematics device 130 (e.g., processor 132) may receive each of the plurality of simulated vehicle parameter profiles (e.g., from the data storage 114 and/or data storage 134).

As shown in FIG. 10 at 1008, a plurality of error profiles may be generated for each of the one or more vehicle maneuvers. For example, the fleet management system 110 (e.g., processor 112) and/or telematics device 130 (e.g., processor 132) may generate the error profiles. As described herein, the error profiles may be generated based on differences between the measured vehicle parameter profile and the plurality of simulated vehicle parameter profiles (e.g., differences between the area under the curves of the simulated vehicle parameter profiles and the measured vehicle parameter profiles).

In the embodiment illustrated in FIG. 10 at 1010, an estimation of the weight of the vehicle may be determined based on the plurality of error profiles. For example, the estimated weight of the vehicle may be determined by the fleet management system 110 (e.g., processor 112) and/or telematics device 130 (e.g., processor 132) may determine the estimated weight of the vehicle 120. As described herein, the error profiles may be minimized and/or averaged to provide an estimated weight of the vehicle. For example, the estimated weight of the vehicle may be determined based on an average of candidate vehicle weights that minimize the error profiles, as described herein. As well, the candidate vehicle weights may be assigned difference weights based on the corresponding error profile. For example, the candidate vehicle weights may be weighted based on a sensitivity of the corresponding error profiles. The sensitivity of an error profile may correspond to the slope or rate of change of that error profile.

In some embodiments, the error profiles may determine whether the one or more identified vehicle maneuvers are suitable for use to determine the load state of the vehicle using the at least one machine learning model, as illustrated by the broken-line arrow in FIG. 10. In more detail, the estimated weight of the vehicle will have error associated therewith that corresponds to the minimized and/or averaged error profiles. If the estimated weight of the vehicle has an error associated therewith that is above a selected value, it may in some cases be desirable to select a different one of the one or more vehicle maneuvers for use with the at least one machine learning model. As will be appreciated, a lower associated error value may indicate that the one or more vehicle maneuvers may result in a more accurate estimation provided by the at least one machine learning program. A maximum allowable associated error may be selected based on, for example, the number of identified vehicle maneuvers, the types of vehicle data associated with the one or more vehicle maneuvers, etc. Examples of maximum allowable associated error may include 25%, 20%, 15%, 10%, 5%, etc.

As will be appreciated, over the course of a trip, a vehicle may perform more than one vehicle maneuver. As a result, the weight of the vehicle may be estimated using the systems and/or methods of the present disclosure multiple times. In such situations, it may be desirable to use the plurality of estimated weights based on the plurality of vehicle maneuvers identified during the trip to provide an overall estimated vehicle weight. For example, the plurality of estimated weights may be averaged or aggregated (e.g., using a majority vote) to provide an overall estimated vehicle weight. As an example, if 15 vehicle maneuvers are identified during a trip, and 13 vehicle maneuverers indicate that the vehicle is "loaded" while 2 vehicle maneuvers indicate that the vehicle is "unloaded", the vehicle may be estimated to be "loaded" based on the majority of estimations provided by the individual vehicle maneuvers. As will be appreciated, if weight values are estimated (i.e., rather than load state), the various estimated weights may be averaged to provide the overall estimated weight. Estimating the weight of the vehicle based on a plurality of vehicle maneuvers identified during a trip may be useful for discriminating against any outliers, if present.

Further, as described herein, at least one machine learning model may be used to determine the estimated weight of the vehicle. That is, in some embodiments, a plurality of machine learning models may be used to generate a plurality of vehicle weight estimations. In such embodiments, it may be desirable to use the plurality of vehicle weight estimations to provide a single final estimated vehicle weight. For example, the plurality of vehicle weight estimations may be averaged or aggregated, as described above in relation to the use of multiple vehicle maneuvers identified during a trip.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific, and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Further, in the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

What is claimed is:

1. A system for training a machine learning model to estimate a weight of a vehicle, the system comprising:
   at least one data storage operable to store vehicle data associated with one or more vehicles, the vehicle data comprising a plurality of portions of vehicle data that are each associated with a vehicle maneuver and that each comprise a measured vehicle parameter profile; and
   at least one processor in communication with the at least one data storage, the at least one processor operable to:
      receive a plurality of simulated vehicle parameter profiles for at least one measured vehicle parameter profile;
      generate a plurality of error profiles based on differences between each of the at least one measured vehicle parameter profiles and the plurality of simulated vehicle parameter profiles;
      determine, using the plurality of error profiles, an estimated vehicle weight value associated with each of the at least one measured vehicle parameter profiles; and
      train the machine learning model by inputting thereinto the plurality of portions of vehicle data and each estimated vehicle weight value associated with each of the at least one measured vehicle parameter profiles thereof, thereby training the at least one machine learning model to estimate a weight of a vehicle based on the vehicle data associated therewith.

2. The system of claim 1, wherein each portion of vehicle data comprises geospatial data, vehicle engine data, or a combination thereof from a duration of the vehicle maneuver.

3. The system of claim 2, wherein each portion of vehicle data comprises normalized accumulated RPM, a normalized accumulated torque, energy, a normalized difference in speed, a normalized difference in elevation, a mean acceleration, a normalized number of gear changes, a change in speed over a selected subsection of time, a change in elevation over a selected subsection of time, or a combination thereof.

4. The system of claim 1, wherein the measured vehicle parameter profile comprises a measured speed profile, a measured torque profile, or a combination thereof, and the plurality of simulated vehicle parameter profiles correspondingly comprise a plurality of simulated speed profiles, a plurality of simulated torque profiles, or a combination thereof.

5. The system of claim 1, wherein the at least one machine learning model comprises a supervised machine learning model, a semi-supervised machine learning model, or a combination thereof.

6. The system of claim 1, wherein the at least one machine learning model is trained to estimate a vehicle load state and/or a vehicle weight value.

7. The system of claim 1, wherein the plurality of simulated vehicle parameter profiles are received for each measured vehicle parameter profile.

8. The system of claim 1, wherein the at least one processor is operable to determine the estimated vehicle weight associated with each of the at least one measured vehicle parameter profiles by minimizing, averaging, or a combination thereof the plurality of error profiles.

9. The system of claim 1, wherein at least one processor is further operable to determine an error associated with the estimated vehicle weight value.

10. The method of claim 9, wherein each of the portions of vehicle data input into the at least one machine learning model comprise a measured vehicle parameter profile associated with an estimated vehicle weight value having an error of less than 25%.

11. A method for training a machine learning model to estimate the weight of a vehicle, the method comprising operating at least one processor to:
   receive vehicle data associated with one or more vehicles, the vehicle data comprising a plurality of portions of vehicle data that are each associated with a vehicle maneuver and that each comprise a measured vehicle parameter profile; and
   receive a plurality of simulated vehicle parameter profiles for at least one measured vehicle parameter profile;
   generate a plurality of error profiles based on differences between each of the at least one measured vehicle parameter profiles and the plurality of simulated vehicle parameter profiles;
   determine, using the plurality of error profiles, an estimated vehicle weight value associated with each of the at least one measured vehicle parameter profiles; and
   train the machine learning model by inputting thereinto the plurality of portions of vehicle data and each estimated vehicle weight value associated with each of the at least one measured vehicle parameter profiles thereof, thereby training the at least one machine learning model to estimate a weight of a vehicle based on the vehicle data associated therewith.

12. The method of claim 11, wherein each portion of vehicle data comprises geospatial data, vehicle engine data, or a combination thereof from a duration of the vehicle maneuver.

13. The method of claim 12, wherein each portion of vehicle data comprises normalized accumulated RPM, a normalized accumulated torque, energy, a normalized difference in speed, a normalized difference in elevation, a mean acceleration, a normalized number of gear changes, a change in speed over a selected subsection of time, a change in elevation over a selected subsection of time, or a combination thereof.

14. The method of claim 11, wherein the measured vehicle parameter profile comprises a measured speed profile, a measured torque profile, or a combination thereof, and the plurality of simulated vehicle parameter profiles correspondingly comprise a plurality of simulated speed profiles, a plurality of simulated torque profiles, or a combination thereof.

15. The method of claim 11, wherein the at least one machine learning model comprises a supervised machine learning model, a semi-supervised machine learning model, or a combination thereof.

16. The method of claim 11, wherein the at least one machine learning model is trained to estimate a vehicle load state and/or a vehicle weight value.

17. The method of claim 11, wherein the plurality of simulated vehicle parameter profiles are received for each measured vehicle parameter profile.

18. The method of claim 11, wherein the determining of the estimated vehicle weight associated with each of the at least one measured vehicle parameter profiles comprises operating the at least one processor to minimize, average, or a combination thereof the plurality of error profiles.

19. The method of claim 11, further comprising operating the at least one processor to determine an error associated with the estimated vehicle weight value.

20. The method of claim 19, wherein each of the portions of vehicle data input into the at least one machine learning model comprise a measured vehicle parameter profile associated with an estimated vehicle weight value having an error of less than 25%.

21. A non-transitory computer readable medium having instructions stored thereon executable by at least one processor to implement a method for determining an estimated weight of a vehicle, the method comprising operating the at least one processor to:

receive vehicle data associated with one or more vehicles, the vehicle data comprising a plurality of portions of vehicle data that are each associated with a vehicle maneuver and that each comprise a measured vehicle parameter profile; and receive a plurality of simulated vehicle parameter profiles for at least one measured vehicle parameter profile;

generate a plurality of error profiles based on differences between each of the at least one measured vehicle parameter profiles and the plurality of simulated vehicle parameter profiles;

determine, using the plurality of error profiles, an estimated vehicle weight value associated with each of the at least one measured vehicle parameter profiles; and train the machine learning model by inputting thereinto the plurality of portions of vehicle data and each estimated vehicle weight value associated with each of the at least one measured vehicle parameter profiles thereof, thereby training the at least one machine learning model to estimate a weight of a vehicle based on the vehicle data associated therewith.

* * * * *